(12) United States Patent
Yamada et al.

(10) Patent No.: US 9,492,747 B2
(45) Date of Patent: Nov. 15, 2016

(54) USING HANDHELD CONTROLLER ATTITUDE TO SELECT A DESIRED OBJECT DISPLAYED ON A SCREEN

(75) Inventors: Yoichi Yamada, Kyoto (JP); Hidemaro Fujibayashi, Kyoto (JP); Ryo Tanaka, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 298 days.

(21) Appl. No.: 12/856,274

(22) Filed: Aug. 13, 2010

(65) Prior Publication Data

US 2011/0291929 A1    Dec. 1, 2011

(30) Foreign Application Priority Data

May 25, 2010    (JP) .................................. 2010-119869

(51) Int. Cl.
| | | |
|---|---|---|
| A63F 13/428 | (2014.01) |
| A63F 13/285 | (2014.01) |
| A63F 13/211 | (2014.01) |
| G06F 3/01 | (2006.01) |
| G06F 3/0346 | (2013.01) |
| G06F 3/0484 | (2013.01) |

(52) U.S. Cl.
CPC ............ *A63F 13/428* (2014.09); *A63F 13/211* (2014.09); *A63F 13/285* (2014.09); *G06F 3/016* (2013.01); *G06F 3/017* (2013.01); *G06F 3/0346* (2013.01); *G06F 3/04842* (2013.01); *A63F 2300/308* (2013.01); *A63F 2300/6045* (2013.01); *A63F 2300/807* (2013.01)

(58) Field of Classification Search
CPC ................ G06F 3/04842; G06F 3/0346; A63F 2300/6045; A63F 13/428
USPC ................................ 345/156–184; 463/36–39
See application file for complete search history.

(56) References Cited

U.S. PATENT DOCUMENTS

| | | | | |
|---|---|---|---|---|
| 5,319,387 A | * | 6/1994 | Yoshikawa | .................... 345/179 |
| 7,031,875 B2 | * | 4/2006 | Ellenby | .................. G01C 21/20 |
| | | | | 702/150 |
| 2007/0013659 A1 | | 1/2007 | Nagata et al. | |

(Continued)

FOREIGN PATENT DOCUMENTS

| | | |
|---|---|---|
| EP | 0 825 514 A2 | 2/1998 |
| EP | 1 759 746 A2 | 3/2007 |

(Continued)

OTHER PUBLICATIONS

Jun Rekimoto. 1996. Tilting operations for small screen interfaces. In Proceedings of the 9th annual ACM symposium on User interface software and technology (UIST '96). ACM, New York, NY, USA, 167-168. DOI=10.1145/237091.237115 http://doi.acm.org/10.1145/237091.237115.*

(Continued)

*Primary Examiner* — Larry Sternbane
(74) *Attorney, Agent, or Firm* — Nixon & Vanderhye P.C.

(57) ABSTRACT

Correspondence data representing correspondence between a plurality of selection target objects and the attitude of an input device is stored in an information processing apparatus. In accordance with attitude/motion data acquired from the input device, the attitude of the input device is calculated. In accordance with the correspondence data, a selection target object corresponding to the attitude of the input device is selected thereby to perform a process based on the selection target object having been selected.

24 Claims, 21 Drawing Sheets

(56) References Cited

U.S. PATENT DOCUMENTS

| | | | |
|---|---|---|---|
| 2008/0096622 A1* | 4/2008 | Terada | 463/2 |
| 2008/0222571 A1* | 9/2008 | Yoshioka | A63F 13/06 715/841 |
| 2009/0051667 A1* | 2/2009 | Park et al. | 345/173 |
| 2009/0066648 A1* | 3/2009 | Kerr et al. | 345/158 |
| 2009/0131167 A1 | 5/2009 | Kawabata | |
| 2009/0327964 A1 | 12/2009 | Mouilleseaux et al. | |

FOREIGN PATENT DOCUMENTS

| | | |
|---|---|---|
| EP | 2 157 498 A1 | 2/2010 |
| JP | 2000-176164 | 6/2000 |
| JP | 2006-526844 | 11/2006 |
| JP | 2007-259988 | 10/2007 |
| JP | 2009-75861 | 4/2009 |
| JP | 2009-247885 | 10/2009 |
| WO | 2004/099903 | 11/2004 |
| WO | 2007/023592 | 3/2007 |

OTHER PUBLICATIONS

Office Action for JP Application No. 2010-119869, Mar. 30, 2012, 3 pages.

Extended European Search Report dated Jul. 1, 2016, issued in European Patent Application No. 10171904.5.

* cited by examiner

F I G. 1 8
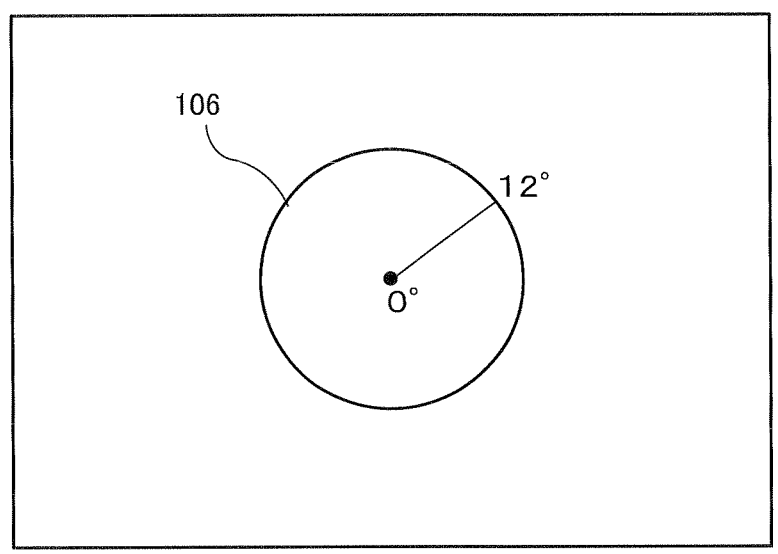

USING HANDHELD CONTROLLER ATTITUDE TO SELECT A DESIRED OBJECT DISPLAYED ON A SCREEN

CROSS REFERENCE TO RELATED APPLICATION

The disclosure of Japanese Patent Application No. 2010-119869, filed May 25, 2010, is incorporated herein by reference.

BACKGROUND OF THE INVENTION

Field of the Invention

The present invention relates to a computer readable storage medium having stored therein an information processing program, an information processing apparatus, an information processing method, and an information processing system, and more specifically to a computer readable storage medium having stored therein an information processing program, an information processing apparatus, an information processing method, and an information processing system which allow selection of a desired object from among a plurality of objects displayed on a screen.

Description of the Background Art

In relation to an operation of selecting an item to be used from among a plurality of items owned by a player character, conventionally proposed is an operation technique of displaying a screen in which items are arranged in a circular ring shape thereby to facilitate item selection (e.g., Japanese Laid-Open Patent Publication No. 2000-176164). In the operation technique, in accordance with input instructions performed with operation buttons, items arranged in a circular ring shape are rotated (shifted) along the circular ring, whereby operations such as item selection and item rearrangement are performed.

However, in the above operation technique, in accordance with the input instructions with the operation buttons, it is necessary to rotate, select, or replace the items. Accordingly, it is not possible to operate a desired item intuitively.

SUMMARY OF THE INVENTION

Thus, an object of the present invention is to provide a computer readable storage medium having stored therein an information processing program, an information processing apparatus, an information processing method, and an information processing system which allow, with an intuitive operation, selection of a desired object from among a plurality of objects displayed on a screen.

To solve the above problem, the present invention employs the following configuration.

A first surface is a computer readable storage medium having stored therein an information processing program executed on a computer of an information processing apparatus performing predetermined information processing based on attitude/motion data acquired from an attitude/motion sensor for detecting an attitude or motion of an input device, and the computer is caused to function as correspondence data storage means, object displaying means, data acquisition means, input attitude calculating means, object selecting means, and information processing means. The correspondence data storage means stores correspondence data representing correspondence between a plurality of selection target objects and attitudes of the input device. The object displaying means displays the plurality of selection target objects on a display unit. The data acquisition means acquires the attitude/motion data. The input attitude calculating means calculates an input attitude, which is an attitude of the input device, in accordance with the attitude/motion data acquired by the data acquisition means. The object selecting means selects a selection target object from among the plurality of selection target objects in accordance with the input attitude calculated by the input attitude calculating means and the correspondence data. The information processing means performs a process according to the selection target object selected by the object selecting means.

According to the first aspect, it is possible to select any of the selection target objects in accordance with the attitude of the input device, and also possible to provide an intuitive selection operation.

In a second aspect based on the first aspect, the information processing means includes: selection confirmation means object reference attitude setting means. The selection confirmation means confirms selection of the selection target object selected by the object selecting means. The object reference attitude setting means sets, when the selection confirmation means has confirmed the selection of the selection target object, the attitude of the input device as a reference attitude for the selection target object whose selection has been confirmed. The information processing means performs a process according to the selection target object whose selection has been confirmed, based on the reference attitude set by the object reference attitude setting means.

According to the second aspect, it is possible to performs a process according to the selection target object, in accordance with the input attitude at the time when the selection is confirmed, and thus it is possible to improve the selection operation and a series of operations for the subsequent processes.

In a third aspect based on the first aspect, the object selecting means selects a selection target object from among the plurality of selection target objects in accordance with a tilt direction and a degree of tilt of the input attitude relative to the display unit.

In a fourth aspect based on the third aspect, the object selecting means: includes projection vector calculating means for calculating a projection vector of the input attitude relative to a display surface of the display unit; and selects a selection target object from among the plurality of selection target objects in accordance with an orientation and magnitude of the projection vector.

According to the third to fourth aspects, a component relative to the display unit, for example, a projection vector is utilized, and thus it is possible to determine selection of a selection target object with a simple process.

In a fifth aspect based on the first aspect, the object displaying means displays the plurality of selection target objects at positions on the display unit, the positions corresponding to the attitudes of the input device in the correspondence data.

According to the fifth aspect, it is possible to cause the user to intuitively understand the correspondence between the display point of each selection target object and the input attitude for selecting the selection target object.

In a sixth aspect based on the fifth, the computer is further caused to function as reference attitude setting means for setting a predetermined reference attitude for the input device. In addition, the correspondence data storage means stores data of an attitude of the input device as an attitude relative to the reference attitude. The object selecting means selects one of the selection target objects in accordance with the input attitude relative to the reference attitude.

According to the sixth aspect, the reference attitude is set for determination of the attitude of the input device, and thus it is possible to provide an intuitive feeling of operation without providing the sense of incongruity.

In a seventh aspect based on the sixth aspect, the computer is further caused to function as angle calculating means for calculating an angle between a direction of the reference attitude and a direction of the input attitude. The object selecting means selects, when the angle calculated by the angle calculating means is equal to or more than a first angle, one of the selection target objects in accordance with the input attitude.

According to the seventh aspect, it is possible to select a selection target object without the input device being moved dynamically.

In an eighth aspect based on the seventh aspect, the computer is further caused to function as object selection cancellation means for cancelling a state where one of the selection target objects is selected when a second angle which is smaller than the first angle is obtained through calculation by the angle calculating means.

According to the eighth aspect, it is possible to easily cancel a state where an object is selected.

In a ninth aspect based on the seventh aspect, the computer is further caused to function as return-to-reference-attitude determination means and object selection cancellation means. The return-to-reference-attitude determination means determines whether or not the input attitude has changed to an attitude that is identical with or similar to the reference attitude, in a state where any of the selection target objects is selected by the object selecting means. The object selection cancellation means cancels a state where one of the selection target objects is selected when the return-to-reference-attitude determination means has determined that the input attitude is identical with or similar to the reference attitude.

According to the ninth aspect, it is possible to obtain the same effect as in the eighth aspect.

In a tenth aspect based on the seventh aspect, the reference attitude setting means sets as the reference attitude an attitude of the input device in a state where a predetermined axis thereof is oriented to the center of the display unit. In addition, the computer is further caused to function as instruction object displaying means for displaying an instruction object which indicates a position, on the display unit, corresponding to the direction in which the predetermined axis of the input device is oriented, at a position, on the display unit, distanced from the center of the display unit toward the direction of the input attitude by a distance corresponding to the angle calculated by the angle calculating means.

According to the tenth aspect, it is possible to cause the user to easily understand the current attitude of the input device, thereby enhancing the operability.

In an 11th aspect based on the tenth aspect, for each of the selection target objects, a predetermined range centered about the selection target object is set as a selection continuation range, and the selection continuation range of one of the selection target objects on the display screen overlaps with that of another one of the selection target objects arranged adjacent thereto. In a state where the one of the selection target objects is selected, when the instruction object is located within the overlapped portion of the selection continuation ranges, the object selecting means maintains the selection state of the one of the selection target objects having been selected.

According to the 11th aspect, when the instruction object is located between selection target objects located adjacent to each other, it is possible to prevent easy cancellation of the selection state, thereby enhancing the operability.

In a 12th aspect based on the tenth aspect, when the angle calculated by the angle calculating means is fixed, the distance corresponding to the angle calculated by the angle calculating means in a state where one of the selection target objects is selected by the object selecting means is longer than the distance corresponding to the angle calculated by the angle calculating means in a state where one of the selection target objects is not selected by the object selecting means.

According to the 12th aspect, depending on whether or not any of the selection target objects is being selected, the distance corresponding to the angle calculated by the angle calculating means can be changed. The operability can be set such that selection of any of the selection target objects can be performed easily, and that once selection is made, the state where the selection target object is being selected is hardly cancelled.

In a 13th aspect based on the sixth aspect, the information processing means includes selection confirmation means and reference attitude updating means. The selection confirmation means confirms selection of one of the selection target objects selected by the object selecting means. The reference attitude updating means updates the reference attitude using the attitude of the input device when the selection of the one of the selection target objects is confirmed by the selection confirmation means. The information processing means performs a process according to the one of the selection target objects whose selection has been confirmed.

According to the 13th aspect, when a predetermined process corresponding to the selected object is performed after selection confirmation, it is possible to perform a process while using the attitude of the input device at the time of the selection confirmation as the reference, thereby enhancing the operability.

In a 14th aspect based on the thirteenth aspect, the information processing means performs a process according to one of the selection target objects whose selection has been confirmed, based on the reference attitude updated by the reference attitude updating means.

According to the 14th aspect, it is possible to enhance a series of operations relating to the selection operation.

In a 15th aspect based on the fifth aspect, the object displaying means displays the plurality of selection target objects at positions on the display unit, at equal spacings, in a manner as to form a ring shape, the positions being based on the attitudes of the input device corresponding to the selection target objects.

According to the 15th aspect, it is possible to realize a more intuitive selection operation.

In a 16th aspect based on the first aspect, the information processing means includes highlighting means for highlighting, when one of the selection target objects has been selected by the object selecting means, at least the one of the selection target objects having been selected.

According to the 16th aspect, it is possible to cause the user to intuitively identify the selection target object currently being selected.

In a 17th aspect based on the first aspect, the input device further includes a vibration unit. The information processing means causes the vibration unit to vibrate for a predetermined period of time when one of the selection target objects is selected by the object selecting means.

According to the 17th aspect, it is possible to easily notify the user that any of the selection target objects has been selected.

In an 18th aspect based on the first aspect, the attitude/motion sensor is an angular velocity sensor detecting angular velocities. The information processing apparatus acquires angular velocity data representing the angular velocities from the input device including the angular velocity sensor. The data acquisition means acquires the angular velocity data. The input attitude calculating means calculates the attitude of the input device in accordance with the angular velocity data acquired by the data acquisition means.

According to the 18th aspect, with the use of the angular velocity data, it is possible to calculate the attitude of the input device more accurately.

A 19th aspect is an information processing apparatus performing predetermined information processing based on attitude/motion data acquired from an attitude/motion sensor for detecting an attitude or motion of an input device. The information processing apparatus includes correspondence data storage means, object displaying means, data acquisition means, input attitude calculating means, object selecting means, and information processing means. The correspondence data storage means stores correspondence data representing correspondence between a plurality of selection target objects and attitudes of the input device. The object displaying means displays the plurality of selection target objects on a display unit. The data acquisition means acquires the attitude/motion data. The input attitude calculating means calculates an input attitude, which is an attitude of the input device, in accordance with the attitude/motion data acquired by the data acquisition means. The object selecting means selects a selection target object from among the plurality of selection target objects in accordance with the input attitude calculated by the input attitude calculating means and the correspondence data. The information processing means performs a process according to the selection target object selected by the object selecting means.

A 20th aspect is an information processing control method which performs predetermined information processing based on attitude/motion data acquired from an attitude/motion sensor for detecting an attitude or motion of an input device, and which further performs a process according to a selection target object selected from among a plurality of selection target objects. The method includes a correspondence data storage step, an object displaying step, a data acquisition step, an input attitude calculating step, an object selecting step, and an information processing step. The correspondence data storage step stores correspondence data representing correspondence between the plurality of selection target objects and attitudes of the input device. The object displaying step displays the plurality of selection target objects on a display unit. The data acquisition step acquires the attitude/motion data. The input attitude calculating step calculates an input attitude, which is an attitude of the input device, in accordance with the attitude/motion data acquired by the data acquisition step. The object selecting step selects a selection target object from among the plurality of selection target objects in accordance with the input attitude calculated by the input attitude calculating step and the correspondence data. The information processing step performs a process according to the selection target object selected by the object selecting step.

A 21st aspect is an information processing system performing predetermined information processing based on attitude/motion data acquired from an attitude/motion sensor for detecting an attitude or motion of an input device. The information processing system includes correspondence data storage means, object displaying means, data acquisition means, input attitude calculating means, object selecting means, and information processing means. The correspondence data storage means stores correspondence data representing correspondence between a plurality of selection target objects and attitudes of the input device. The object displaying means displays the plurality of selection target objects on a display unit. The data acquisition means acquires the attitude/motion data. The input attitude calculating means calculates an input attitude, which is an attitude of the input device, in accordance with the attitude/motion data acquired by the data acquisition means. The object selecting means selects a selection target object from among the plurality of selection target objects in accordance with the input attitude calculated by the input attitude calculating means and the correspondence data. The information processing means performs a process according to the selection target object selected by the object selecting means.

According to the 19th to 21st aspects, it is possible to obtain the same effect as in the first aspect.

According to the present invention, it is possible to select a desired object from among a plurality of selection target objects with an intuitive operation.

These and other objects, features, aspects and advantages of the present invention will become more apparent from the following detailed description of the present invention when taken in conjunction with the accompanying drawings.

BRIEF DESCRIPTION OF THE DRAWINGS

FIG. 18 is a diagram illustrating an angle of the current attitude;

DESCRIPTION OF THE PREFERRED EMBODIMENTS

Hereinafter, embodiments of the present invention will be described with reference to the drawings. Note that the present invention is not limited to the embodiments.

[Overall structure of Game System]

Figure 1:
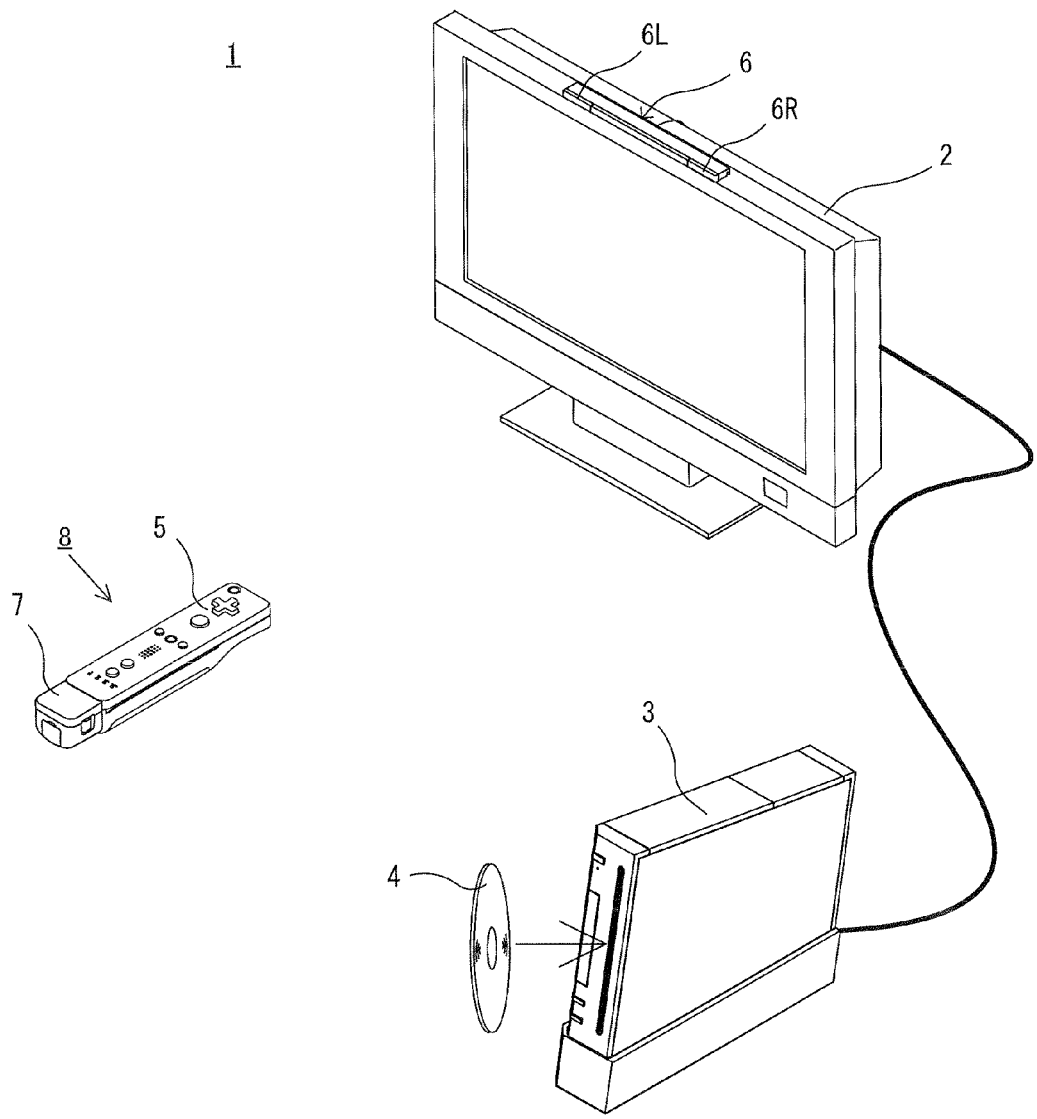
FIG. 1 is an external view of a game system 1.

With reference to FIG. 1, a game system 1 including a game apparatus according to an embodiment of the present invention will be described. FIG. 1 is an external view illustrating a game system 1. Hereinafter, a game apparatus and a game program according to the embodiment will be described by using a stationary game apparatus as an example. As shown in FIG. 1, the game system 1 includes a television receiver (hereinafter, referred to simply as a "television") 2, a game apparatus 3, an optical disc 4, an input device 8, and a marker section 6. In the present system, a game process is executed on the game apparatus 3 in accordance with a game operation using the input device 8.

Into the game apparatus 3, the optical disc 4, which typifies an information storage medium and is exchangeable with respect to the game apparatus 3, is detachably inserted. In the optical disc 4, the game program executed on the game apparatus 3 is stored. The game apparatus 3 has, on the front surface thereof, an opening through which the optical disc 4 is inserted. The game processing is executed on the game apparatus 3 by reading and executing the game program stored in the optical disc 4 which is inserted in the game apparatus 3 through the opening.

The game apparatus 3 is connected via a connection cord to the television 2 typifying a display device. The television 2 displays a game image generated through the game processing executed on the game apparatus 3. Further, the marker section 6 is provided in the vicinity of the screen of the television 2 (on the top surface of the screen shown in FIG. 1). The marker section 6 includes two markers, a marker 6R and a marker 6L, at both ends thereof. Specifically, each of the markers 6R and 6L includes at least one infrared LED, and outputs infrared light forward from the television 2. The marker section 6 is connected to the game apparatus 3, and the game apparatus 3 is capable of controlling each infrared LED included in the marker section 6 so as to be lit up.

The input device 8 supplies, to the game apparatus 3, operation data representing a content of an operation performed therein. In the present embodiment, the input device 8 includes a controller 5 and a gyro-sensor unit 7. In the input device 8, the gyro-sensor unit 7 is detachably connected to the controller 5, the details of which will be described below. The controller 5 is connected to the game apparatus 3 by wireless communication. In the present embodiment, for example, the Bluetooth (registered trademark) technology is used for the wireless communication between the controller 5 and the game apparatus 3. In another embodiment, the controller 5 and the game apparatus 3 may communicate with each other by a wired connection.

[Internal Structure of Game Apparatus 3]

Figure 2:
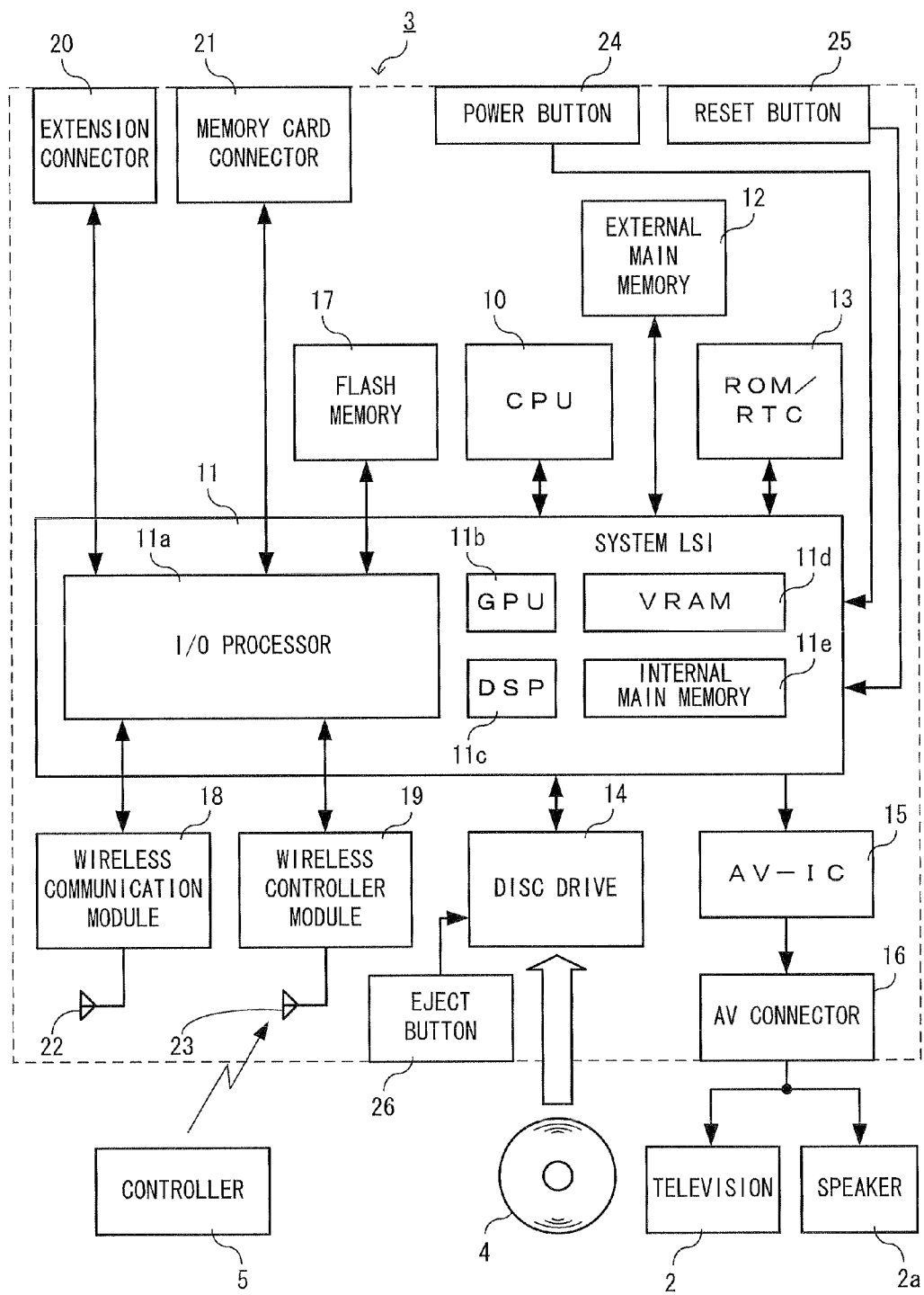
FIG. 2 is a block diagram illustrating a configuration of a game apparatus 3.

Subsequently, with reference to FIG. 2, an internal structure of the game apparatus 3 will be described. FIG. 2 is a block diagram illustrating a structure of the game apparatus 3. The game apparatus 3 includes a CPU 10, a system LSI 11, an external main memory 12, a ROM/RTC 13, a disc drive 14, an AV-IC 15, and the like.

The CPU 10, serving as a game processor, executes the game program stored in the optical disc 4 so as to perform the game processing. The CPU 10 is connected to the system LSI 11. In addition to the CPU 10, the external main memory 12, the ROM/RTC 13, the disc drive 14, and the AV-IC 15 are also connected to the system LSI 11. The system LSI 11 performs processing such as control of data transmission between respective components connected thereto, generation of an image to be displayed, and acquisition of data from an external apparatus. An internal structure of the system LSI 11 will be described below. The external main memory 12, which is of a volatile type, stores programs, such as a game program read from the optical disc 4 or a flash memory 17, and various data, and is used as a work area and a buffer area for the CPU 10. The ROM/RTC 13 includes a ROM (so-called boot ROM) incorporating a program for booting the game apparatus 3, and a clock circuit (RTC: real time clock) for counting time. The disc drive 14 reads, from the optical disc 4, program data, texture data and the like, and writes the read data into an internal main memory 11e described below or the external main memory 12.

Provided in the system LSI 11 are an input/output processor (I/O processor) 11a, a GPU (Graphics Processor Unit) 11b, a DSP (Digital Signal Processor) 11c, a VRAM 11d, and the internal main memory 11e. These components 11a to 11e are connected to each other via an internal bus which is not shown.

The GPU 11b, which is a part of rendering means, generates an image in accordance with a graphics command (draw command) from the CPU 10. The VRAM 11d stores therein data (such as polygon data and texture data) necessary for the GPU 11b to execute the graphics command. When an image is to be generated, the GPU 11b generates image data by using the data stored in the VRAM 11d.

The DSP 11c functions as an audio processor, and generates audio data by using sound data and sound waveform (tone quality) data stored in the internal main memory 11e or the external main memory 12.

The image data and the audio data generated as described above are read by the AV-IC 15. The AV-IC 15 outputs the read image data to the television 2 via an AV connector 16, and also outputs the read audio data to a speaker 2a of the television 2. Thus, an image is displayed on the television 2, and a sound is outputted from the speaker 2a.

The I/O processor 11a executes data reception and transmission between the components connected thereto and download of data from an external apparatus. The I/O processor 11a is connected to the flash memory 17, a wireless communication module 18, a wireless controller module 19, an extension connector 20, and a memory card connector 21. To the wireless communication module 18, an antenna 22 is connected, and to the wireless controller module 19, an antenna 23 is connected.

The I/O processor 11a may be connected to a network via the wireless communication module 18 and the antenna 22 so as to communicate with another game apparatus or various servers connected to the network. The I/O processor 11a accesses the flash memory 17 at regular time intervals so as to detect presence or absence of data which is required to be transmitted to the network. When such data is present, the data is transmitted to the network via the wireless communication module 18 and the antenna 22. Further, the I/O processor 11a receives, via the network, the antenna 22 and the wireless communication module 18, data transmitted from another game apparatus or data downloaded from a download server, and stores the received data in the flash memory 17. The CPU 10 executes the game program to read the data stored in the flash memory 17, thereby using the read data on the game program. The flash memory 17 may store not only the data transmitted and received between the game apparatus 3 and another game apparatus or various servers, but also saved data (result data or intermediate step data of the game) of a game played with the game apparatus 3.

Further, the I/O processor 11a receives the operation data transmitted from the controller 5, via the antenna 23 and the wireless controller module 19, and (temporarily) stores the operation data in a buffer area of the internal main memory 11e or the external main memory 12.

Further, the extension connector 20 and the memory card connector 21 are connected to the I/O processor 11a. The extension connector 20 is an interface connector as typified by a USB and an SCSI, and is capable of performing communication with the network, instead of the wireless communication module 18, by connecting thereto a medium such as an external storage medium, a peripheral device such as another controller, or a wired communication connector. The memory card connector 21 is a connector for connecting thereto the external storage medium such as a memory card. For example, the I/O processor 11a accesses the external storage medium via the extension connector 20 or the memory card connector 21, so as to store data in the external storage medium or to read data from the external storage medium.

The game apparatus 3 includes a power button 24, a reset button 25, and an eject button 26. The power button 24 and the reset button 25 are connected to the system LSI 11. When the power button 24 is turned ON, the power is supplied to the respective components of the game apparatus 3 via an AC adapter which is not shown. When the reset button 25 is pressed, the system LSI 11 restarts a boot program of the game apparatus 3. The eject button 26 is connected to the disc drive 14. When the eject button 26 is pressed, the optical disc 4 is ejected from the disc drive 14.

[Structure of the Input Device 8]

Figure 3:
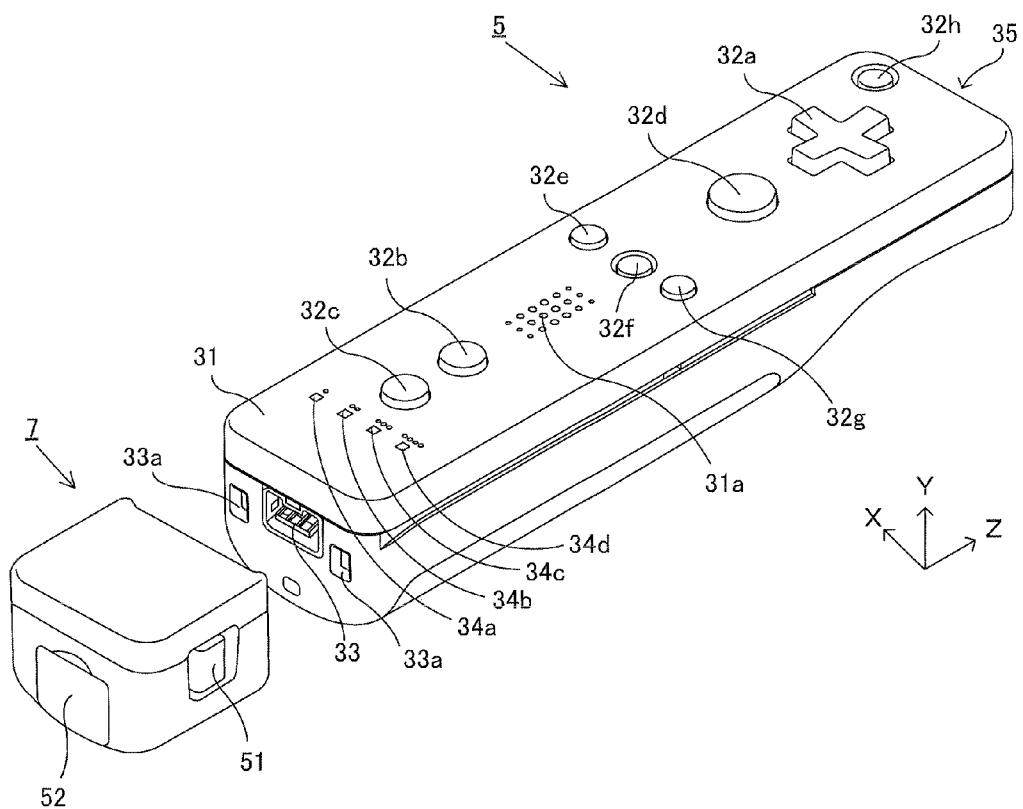
FIG. 3 is a perspective view illustrating an external appearance of an input device 8.
Figure 4:
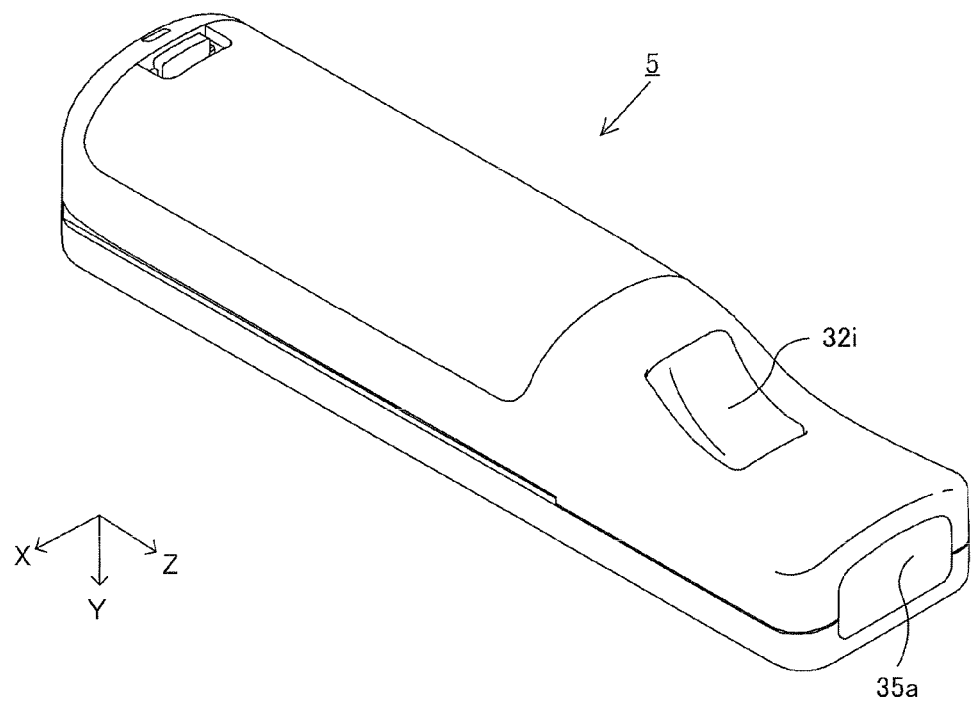
FIG. 4 is a perspective view illustrating an external appearance of a controller 5.

Subsequently, the input device 8 is described with reference to FIG. 3 to FIG. 6. FIG. 3 is a perspective view illustrating an external appearance of the input device 8. FIG. 4 is a perspective view illustrating an external appearance of the controller 5. FIG. 3 is a perspective view of the controller 5 as viewed from the top rear side thereof. FIG. 4 is a perspective view of the controller 5 as viewed from the bottom front side thereof.

In FIG. 3 and FIG. 4, the controller 5 has a housing 31 formed through, for example, plastic molding. The housing 31 has a generally parallelepiped shape extending in a longitudinal direction from front to rear (the direction of Z-axis shown in FIG. 3). The overall size of the housing 31 is small enough to be held by one hand of an adult or even a child. The player can perform a game operation by pressing the buttons provided on the controller 5, and by moving the controller 5 in such a manner as to change the position and the attitude thereof.

The housing 31 is provided with a plurality of operation buttons. As shown in FIG. 3, on the top surface of the housing 31, a cross button 32a, a No. 1 button 32b, a No. 2 button 32c, an A button 32d, a minus button 32e, a home button 32f, a plus button 32g, and a power button 32h are provided. The top surface of the housing 31 on which the buttons 32a to 32h are provided is also referred to as a "button side" herein. On the other hand, as shown in FIG. 4, on the bottom surface of the housing 31, a recessed portion is formed, and on a slope surface of the recessed portion on the rear bottom surface thereof, a B button 32i is provided. Various functions are assigned to the operation buttons 32a to 32i, respectively, in accordance with the game program executed by the game apparatus 3. The power button 32h is for turning on and off the power to the game apparatus 3 by remote control. The home button 32f and the power button 32h each have a top surface thereof buried in the top surface of the housing 31. This prevents the player from inadvertently pressing the home button 32f or the power button 32h.

On the rear surface of the housing 31, a connector 33 is provided. The connector 33 is used for connecting another apparatus (for example, the gyro-sensor unit 7 or another controller) to the controller 5. On both sides of the connector 33 at the rear surface of the housing 31, latch holes 33a are provided so as to prevent another apparatus mentioned above from being easily dismounted therefrom.

In the rear portion of the top surface of the housing 31, a plurality (four in FIG. 3) of LEDs 34a to 34d are provided. Here, a controller type (number) is assigned to the controller 5 such that the controller 5 is distinguishable from other main controllers. For example, the LEDs 34a to 34d are used for informing the player of the controller type which is currently set for the controller 5, or of remaining battery capacity of the controller 5, or the like. Specifically, when a game is played using the controller 5, one of the plurality of LEDs 34a to 34d is lit up, in accordance with the controller type.

Moreover, the controller 5 includes an imaging information calculation section 35 (FIG. 6), and as shown in FIG. 4, a light entrance surface 35a for the imaging information calculation section 35 is provided on the front surface of the housing 31. The light entrance surface 35a is made of a material which allows an infrared light emitted from the markers 6R and 6L to pass therethrough at least.

A sound hole 31a for outputting a sound from a speaker 49 (FIG. 5) of the controller 5 is formed between the No. 1 button 32b and the home button 32f on the top surface of the housing 31.

Figure 5:
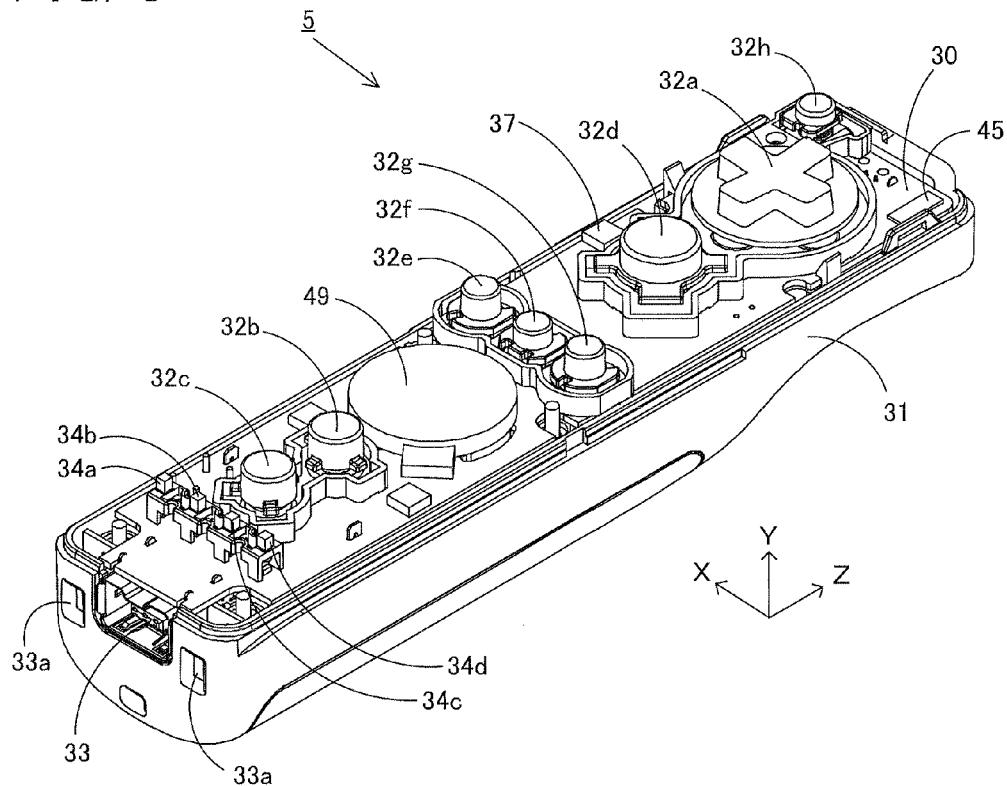
FIG. 5 is a diagram illustrating an internal structure of the controller 5.
Figure 6:
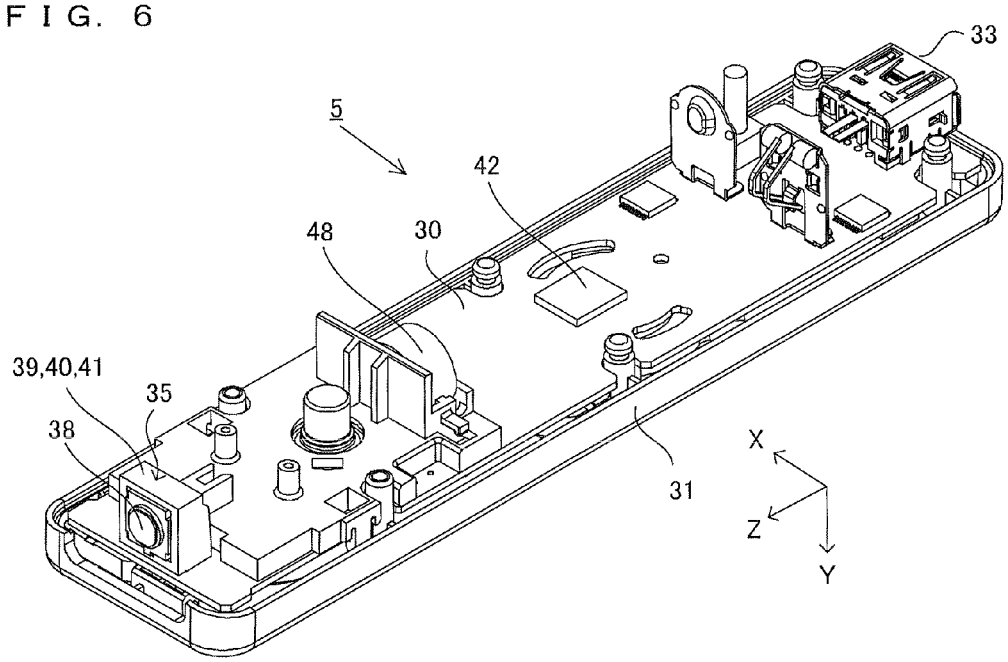
FIG. 6 is a diagram illustrating an internal structure of the controller 5.

With reference to FIGS. 5 and 6, an internal structure of the controller 5 will be described. FIG. 5 and FIG. 6 are diagrams illustrating an internal structure of the controller 5. FIG. 5 is a perspective view illustrating a state where an upper housing (a part of the housing 31) of the controller 5 is removed. FIG. 6 is a perspective view illustrating a state where a lower housing (a part of the housing 31) of the controller 5 is removed. FIG. 6 is a perspective view illustrating a reverse side of a substrate 30 shown in FIG. 5.

As shown in FIG. 5, the substrate 30 is fixed inside the housing 31. On the top main surface of the substrate 30, the operation buttons 32a to 32h, LEDs 34a to 34d, an acceleration sensor 37, an antenna 45, a speaker 49, and the like are provided. These components are connected to a microcomputer 42 (see FIG. 6) via lines (not shown) provided on the substrate 30 and the like. In the present embodiment, the acceleration sensor 37 is located in a position shifted from the center of the controller 5 in an X-axis direction. This allows easier calculation of a motion of the controller 5 while the controller 5 is being rotated about a Z-axis. The acceleration sensor 37 is located in a position shifted toward the front of the controller 5 from the center thereof in a longitudinal direction (Z-axis direction). The controller 5 functions as a wireless controller by using a wireless module 44 (FIG. 6) and the antenna 45.

As shown in FIG. 6, at the front edge of the bottom main surface of the substrate 30, the imaging information calculation section 35 is provided. The imaging information calculation section 35 includes an infrared filer 38, a lens 39, an image pickup element 40, and an image processing circuit 41 located in order, from the front surface of the controller 5. These components 38 to 41 are fixed to the bottom main surface of the substrate 30, respectively.

On the bottom main surface of the substrate 30, the microcomputer 42 and a vibrator 48 are provided. The vibrator 48 is, for example, a vibrating motor or a solenoid, and is connected to the microcomputer 42 via lines provided in the substrate 30 and the like. An instruction from the microcomputer 42 actuates the vibrator 48, to cause the controller 5 to vibrate. The vibration is conveyed to the player's hand holding the controller 5. Thus, a so-called vibration-feedback game is realized. In the present embodiment, the vibrator 48 is located in a position slightly forward from the longitudinal center of the housing 31. That is, the vibrator 48 is located in a position shifted from the center of the controller 5, toward the end thereof. Thus, the vibration of the vibrator 48 allows the controller 5 to vibrate to a large extent. The connector 33 is fixed at the rear edge of the bottom main surface of the substrate 30. In addition to the components shown in FIG. 5 and FIG. 6, the controller 5 includes a crystal oscillator for generating a reference clock of the microcomputer 42, an amplifier for outputting an audio signal to the speaker 49, and the like.

The gyro-sensor unit 7 includes gyro-sensors (gyro-sensors 55 and 56 shown in FIG. 7) for detecting angular velocities about three axes. The gyro-sensor unit 7 is detachably mounted to the connector 33 of the controller 5. A plug (plug 53 shown in FIG. 7) which is connectable to the connector 33 is provided at the front edge (in the Z-axis positive direction shown in FIG. 3) of the gyro-sensor unit 7. A hook (not shown) is provided on each side of the plug 53. When the gyro-sensor unit 7 is mounted on the controller 5, the plug 53 is connected to the connector 33 and the hooks are engaged in the latch holes 33a of the controller 5, respectively. Thus, the gyro-sensor unit 7 is firmly fixed to the controller 5. The gyro-sensor unit 7 has buttons 51 on side surfaces thereof (surfaces in the X-axis direction shown in FIG. 3). When pressed, the buttons 51 release the engagement between the hooks and the latch holes 33a. Therefore, by pulling the plug 53 out of the connector 33 while pressing the buttons 51, it is possible to dismount the gyro-sensor unit 7 from the controller 5.

At the rear end of the gyro-sensor unit 7, a connector having the same shape as the connector 33 is provided. Accordingly, another apparatus which can be mounted onto (the connector 33 of) the controller 5 can also be mounted onto the connector provided in the gyro-sensor unit 7. As shown in FIG. 3, a cover 52 is detachably mounted to the connector.

Note that the shapes of the controller 5 and the gyro-sensor unit 7, the shapes of the operation buttons, the number and the positions of the acceleration sensor and vibrator shown in FIG. 3 through FIG. 6 are merely examples, and any other shapes, numbers, and positions may be used to realize the present invention. In the present embodiment, the imaging direction used for the imaging means is the Z-axis positive direction. However, any direction may be used as an imaging direction. In other words, a position of the imaging information calculation section 35 (the light entrance surface 35a of the imaging information calculation section 35) of the controller 5 is not necessarily located at the front surface of the housing 31, and may be located at any other surface as long as light can be obtained from an outside of the housing 31.

Figure 7:
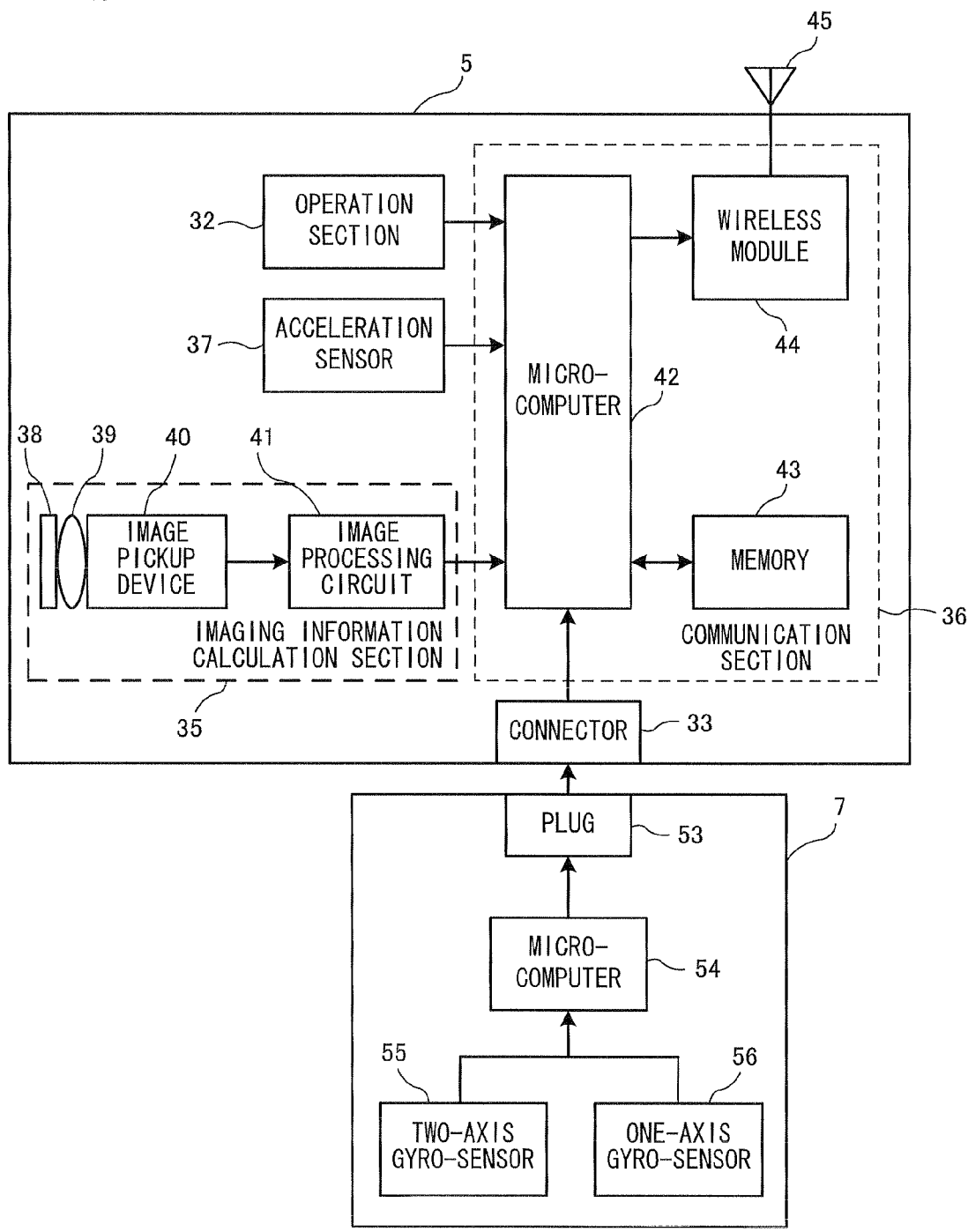
FIG. 7 is a block diagram illustrating a configuration of the input device 8.

FIG. 7 is a block diagram illustrating a structure of the input devices 8 (the controller 5 and the gyro-sensor unit 7). The controller 5 includes the operation section 32 (the operation buttons 32a to 32i), the connector 33, the imaging information calculation section 35, a communication section 36, and the acceleration sensor 37. The controller 5 transmits, to the game apparatus 3, data representing a content of an operation performed using the controller 5, as operation data.

The operation section 32 includes the operation buttons 32a to 32i described above, and outputs, to the microcomputer 42 of the communication section 36, operation button data representing an input state of each of the operation buttons 32a to 32i (whether or not the operation buttons 32a to 32i are pressed).

The imaging information calculation section 35 is a system for analyzing image data taken by imaging means and calculating the position of the center of gravity, the size, and the like of an area having a high brightness in the image data. The imaging information calculation section 35 has, for example, a maximum sampling period of about 200 frames/sec., and therefore can trace and analyze even a relatively fast motion of the controller 5.

The imaging information calculation section 35 includes the infrared filter 38, the lens 39, the image pickup element 40 and the image processing circuit 41. The infrared filter 38 allows, among lights incident on the front surface of the controller 5, only an infrared light to pass therethrough. The lens 39 collects the infrared light which has passed through the infrared filter 38 and outputs the infrared light to the image pickup element 40. The image pickup element 40 is a solid-state image pickup device such as, for example, a CMOS sensor or a CCD sensor. The image pickup element 40 receives the infrared light collected by the lens 39 and outputs an image signal. Each of the markers 6R and 6L of the marker section 6 located in the vicinity of the display of the television 2 includes an infrared LED which outputs an infrared light forward from the television 2. Thus, by providing the infrared filer 38, the image pickup element 40 is able to receive only the infrared light which has passed through the infrared filter 38, so as to generate an image data. Accordingly, the image pickup element 40 is able to pick up a more precise image of the markers 6R and 6L. Hereinafter, the image picked up by the image pickup element 40 is referred to as a picked up image. Image data generated by the image pickup element 40 is processed by the image processing circuit 41. The image processing circuit 41 calculates a position of an imaging target (markers 6R and 6L) in a picked up image. The image processing circuit 41 outputs coordinates representing the calculated position to the microcomputer 42 in the communication section 36. The data of the coordinates is transmitted, as operation data, to the game apparatus 3 by the microcomputer 42. Hereinafter, the coordinates as described above are referred to as "a marker coordinate point." Since the marker coordinate point will change in accordance with the orientation (inclination angle) and the position of the controller 5, the game apparatus 3 is allowed to calculate the orientation and the position of the controller 5 by using the marker coordinate point.

In another embodiment, the controller 5 may not necessarily include the image processing circuit 41, and thus a picked up image may be transmitted as it is from the controller 5 to the game apparatus 3. In such a case, the game apparatus 3 may have a circuit or a program which has a function similar to that of the image processing circuit 41, so as to calculate the marker coordinate point.

The acceleration sensor 37 detects acceleration (including gravitational acceleration) of the controller 5, that is, the force (including the gravity) applied to the controller 5. The acceleration sensor 37 detects a value of acceleration component in a straight line direction (linear acceleration) along the sensing axis of the acceleration applied to the detection section of the acceleration sensor 37. For example, a multi-axis acceleration sensor, which is capable of detecting acceleration in directions along two or more axes, detects components of the acceleration along the axes, respectively, as the acceleration applied to the detection section of the acceleration sensor. For example, the two-axis or three-axis acceleration sensor may be of the type available from Analog Devices, Inc. or STMicroelectronics N.V. For example, the acceleration sensor 37 may be of the electrostatic capacitance type. However, other types of acceleration sensor may be used.

In the present embodiment, the acceleration sensor 37 detects linear acceleration in three directions, i.e. an up-down direction (the Y-axis direction shown in FIG. 3), a left-right direction (the X-axis direction shown in FIG. 3), and a front-rear direction (the Z-axis a direction shown in FIG. 3) with respect to the controller 5. Since the acceleration sensor 37 detects the acceleration in the straight line directions along the axes, an output from the acceleration sensor 37 represents values of linear acceleration in the directions along the three axes, respectively. In other words, the detected acceleration is represented by a three-dimensional vector (ax, ay, az) in an XYZ coordinate system (controller coordinate system) defined with respect to the input device 8 (controller 5). Hereinafter, a vector having components representing acceleration values in the directions along the three axes, detected by the acceleration sensor 37, is referred to as an acceleration vector.

Data representing the acceleration (acceleration data) detected by the acceleration sensor 37 is outputted to the communication section 36. Since acceleration detected by the acceleration sensor 37 varies in accordance with an orientation (inclination angle) and a motion of the controller 5, the game apparatus 3 is able to calculate the orientation and the motion of the controller 5 by using the acceleration data. In the present embodiment, the game apparatus 3 determines the attitude of the controller 5 based on the acceleration data.

The data (acceleration data) representing the acceleration (acceleration vector) detected by the acceleration sensor 37 is outputted to the communication section 36. In the present embodiment, the acceleration sensor 37 is used as a sensor for outputting data for determining the inclination angle of the controller 5.

Note that, through processing performed by a computer such as a processor of a game apparatus 3 (e.g. the CPU 10) or a processor of the controller 5 (e.g. the microcomputer 42) based on the acceleration signals outputted from the acceleration sensor 37, additional information relating to the controller 5 can be inferred or calculated (determined), as one skilled in the art will readily understand from the description herein. For example, when the processing is performed by the computer on the assumption that the controller 5 provided with the acceleration sensor 37 is in a static state (i.e., when the processing is performed while acceleration detected by the acceleration sensor is only the gravitational acceleration), if the controller 5 is actually in a static state, the detected acceleration is used to determine whether or not the controller 5 is inclined relative to the direction of gravity or to what degree the controller 5 is inclined relative to the direction of gravity. More specifically, when a state where a detection axis of the acceleration sensor 37 extends in a vertically-down direction is set as a reference, it is possible to determine whether or not the controller 5 is inclined relative to the reference, by determining whether or not 1G (the gravitational acceleration) is applied, and it is also possible to determine to what degree the controller 5 is inclined relative to the reference direction, by determining the magnitude of the detected acceleration. In addition, in a case of a multi-axis acceleration sensor 37, it is possible to determine in detail to what degree the controller 5 is inclined relative to the direction of gravity through processing of a signal representing acceleration detected along each axis. In this case, the processor may calculate an inclination angle of the controller 5 based on the output from the acceleration sensor 37, or alternatively, may calculate a direction of inclination of the controller 5 without calculating the inclination angle. As described above, the acceleration sensor 37 may be used in combination with the processor to determine an inclination angle or attitude of the controller 5.

On the other hand, on the assumption that the controller 5 is in a dynamic state (the controller 5 is being moved), the acceleration sensor 37 detects acceleration corresponding to a motion of the controller 5 in addition to the gravitational acceleration. Thus, it is possible to determine a direction of the motion of the controller 5 by eliminating from the detected acceleration the gravitational acceleration component through predetermined processing. It is noted that even on the assumption that the controller 5 is in a dynamic state, it is possible to determine an inclination of the controller 5 relative to the direction of gravity by eliminating from the detected acceleration an acceleration component corresponding to a motion of the acceleration sensor through predetermined processing. In an alternative embodiment, the acceleration sensor 37 may include an embedded processing apparatus or another type of dedicated processing apparatus for performing predetermined processing of the acceleration signal detected by the acceleration detection means therein prior to outputting the signal to the microcomputer 42. For example, the embedded or dedicated processing apparatus may convert the acceleration signal into a corresponding inclination angle (or into other preferred parameters) in a case where the acceleration sensor 37 is used to detect static acceleration (e.g., the gravitational acceleration).

The communication section 36 includes the microcomputer 42, a memory 43, the wireless module 44, and the antenna 45. The microcomputer 42 controls the wireless module 44 for wirelessly transmitting the data acquired by the microcomputer 42 to the game apparatus 3 while using the memory 43 as a storage area during the processing. The microcomputer 42 is connected to the connector 33. The data transmitted from the gyro-sensor unit 7 is inputted into the microcomputer 42 via the connector 33. Hereinafter, the structure of the gyro-sensor unit 7 is described.

The gyro-sensor unit 7 includes the plug 53, a microcomputer 54, a two-axis gyro-sensor 55, and a one-axis gyro-sensor 56. As described above, the gyro-sensor unit 7 detects angular velocities about the three axes (XYZ axes in the present embodiment), respectively, and transmits the data (angular velocity data) representing the detected angular velocities to the controller 5.

The two-axis gyro-sensor 55 detects an angular velocity (per unit time) about an X-axis and an angular velocity (per unit time) about a Y-axis. The one-axis gyro-sensor 56 detects an angular velocity (per unit time) about a Z-axis. Hereinafter, relative to the imaging direction (Z-axis positive direction) of the controller 5, a rotation direction about the X axis is referred to as a roll direction; a rotation about the Y axis, a pitch direction; and a rotation direction about the Z axis, a yaw direction. In other words, the two-axis gyro-sensor 55 detects an angular velocity in the roll direction (rotation direction about the X-axis) and an angular velocity in the pitch direction (rotation direction about the Y-axis), and the one-axis gyro-sensor 56 detects an angular velocity in the yaw direction (rotation direction about the Z-axis).

In the present embodiment, the two-axis gyro-sensor 55 and the one-axis gyro-sensor 56 are used so as to detect the angular velocities about three axes. In other embodiments, however, any number and any combination of gyro-sensors may be used as long as angular velocities about three axes are detected.

In the present embodiment, in order to provide easier calculation in attitude calculation processing described below, the three axes about which angular velocities are detected by the gyro-sensors 55 and 56 are set to correspond to the three axes (XYZ axes) about which acceleration is detected by the acceleration sensor 37. In other embodiments, however, the three axes about which angular velocities are detected by the gyro-sensors 55 and 56 may not necessarily correspond to the three axes about which acceleration is detected by the acceleration sensor 37.

The data representing the angular velocities detected by the gyro-sensors 55 and 56 is outputted to the microcomputer 54. Accordingly, into the microcomputer 54, the data representing the angular velocities about the three XYZ axes is inputted. The microcomputer 54 transmits via the plug 53 to the controller 5 the data representing the angular velocities about the three axes, as angular velocity data. The transmission from the microcomputer 54 to the controller 5 is performed at predetermined time intervals. Since game processing is generally performed at a cycle of 1/60 sec. (as one frame time), the transmission is preferably performed at a cycle of a shorter time period than the period described above.

Returning to the description of the controller 5, the data outputted to the microcomputer 42 from the operation section 32, from the imaging information calculation section 35, and from the acceleration sensor 37, and the data transmitted to the microcomputer 42 from the gyro-sensor unit 7 are temporarily stored in the memory 43. The pieces of data are transmitted to the game apparatus 3 as the operation data. That is, at a timing of performing a transmission to the wireless controller module 19 of the game apparatus 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency and to radiate the resultant weak radio signal from the antenna 45. In other words, the operation data is modulated into a weak radio signal by the wireless module 44 to be transmitted from the controller 5. The weak radio signal is received by the wireless controller module 19 at the game apparatus 3. The game apparatus 3 demodulates or decodes the weak radio signal to acquire the operation data. The CPU 10 of the game apparatus 3 performs the game processing in accordance with the acquired operation data and the game program. The wireless transmission from the communication section 36 to the wireless controller module 19 is performed at predetermined time intervals. Since game processing is generally performed at a cycle of 1/60 sec. (as one frame time), the transmission is preferably performed at a cycle of a shorter time period than the period described above. The communication section 36 of the controller 5 outputs the operation data to the wireless controller module 19 of the game apparatus 3, for example, once every 1/200 sec.

By using the controller 5, the player can perform operations of tilting the controller 5 at any inclination angle, in addition to conventional general game operations such as pressing the operation buttons. Further, by using the controller 5, the player can also perform an operation of pointing at any position on a screen and an operation of moving the controller 5.

Subsequently, outlines of operations and processing in the present embodiment will be described. In the present embodiment, executed is processing which enables selection of a predetermined object (such as icons) displayed on a screen in accordance with the attitude of the input device 8. For example, in a case where two selectable objects are displayed on the screen, a process as follows is performed. That is, when the input device 8 is held such that the Z direction thereof is parallel to the ground, and the front end thereof is pointed to the left relative to the screen, a first object will be selected. On the other hand, when the input device 8 is arranged such that the Z-axis direction thereof is perpendicular to the ground, and the front end thereof is pointed immediately above, a second object will be selected.

Figure 8:
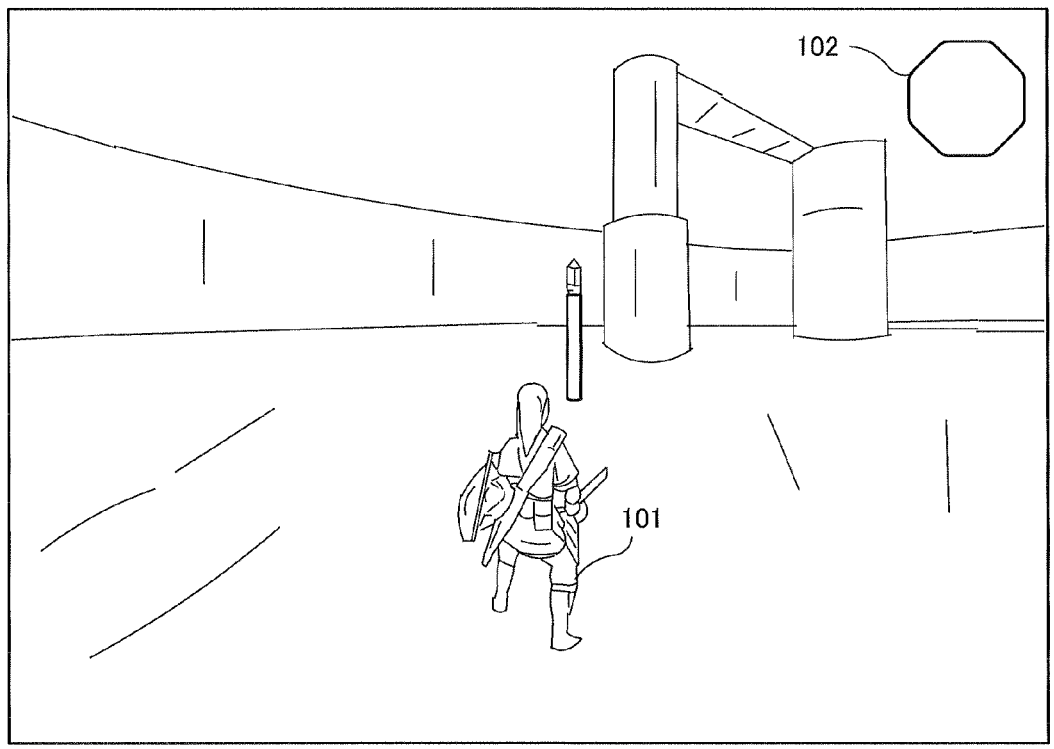
FIG. 8 is an example of a game screen assumed in this embodiment.

Subsequently, as an example of the above process, an outline of a game assumed in the present embodiment and processing performed for the game will be described. The game assumed in the present embodiment is an action adventure game played in a virtual three-dimensional space. FIG. 8 is an example of a screen of this game. In FIG. 8, a virtual three-dimensional space and a player object 101, which are drawn from a so-called third person viewpoint, are displayed as a game screen. In addition, in this game, the player object 101 uses a weapon (hereinafter, a main weapon), thereby to fight against an enemy object not shown. Moreover, the player object 101 can use sub weapons or items. There is a plurality of sub weapons or items arranged, and the player advances the game while appropriately and selectively use these sub weapons or items. Processing described in the present embodiment is the processing relating to an operation of selection of the sub weapons or the items.

At around the upper right corner of the game screen, an armament icon 102 is displayed. The armament icon 102 is an icon representing a sub weapon or item the player object 101 is currently equipped with. When the player object is equipped with nothing, the armament icon 102 is in blank, as shown in FIG. 8.

Figure 9:
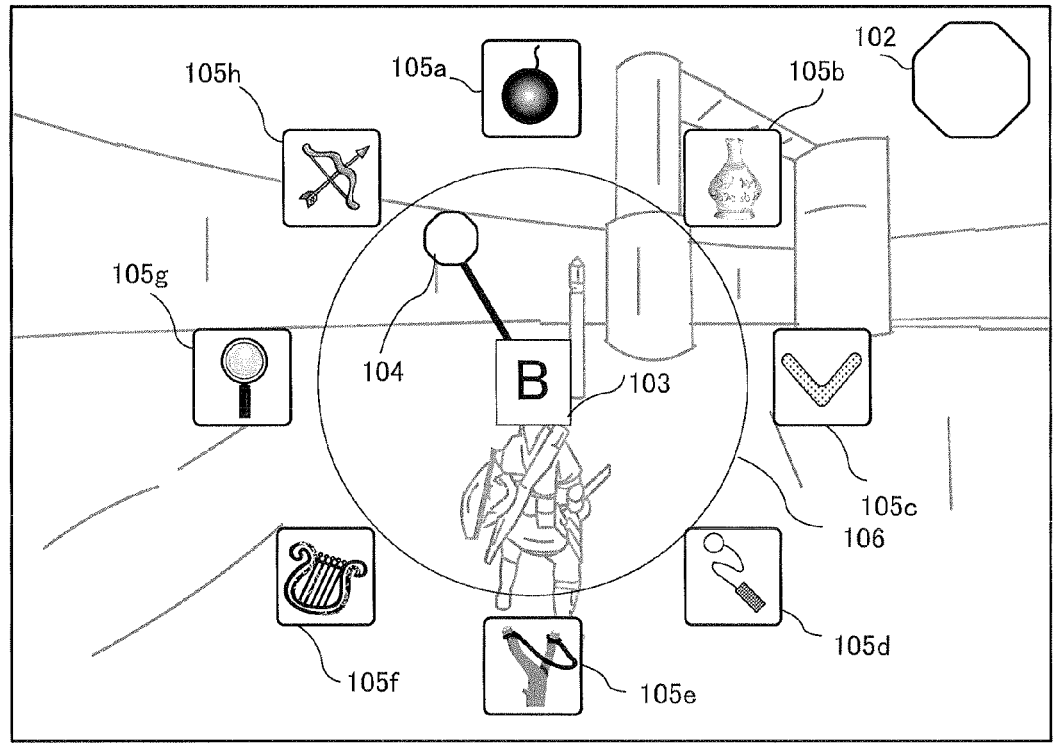
FIG. 9 is an example of an item selection screen.

Subsequently, an operation of selecting the sub weapon or item and the screen during the operation will be described specifically. Initially, in the screen shown in FIG. 8, when a player presses the B button 32i of the input device 8, a sub weapon item selection screen (hereinafter simply referred to as an item selection screen), as shown in FIG. 9, is displayed. In FIG. 9, a screen is displayed in which eight images are arranged in a circular ring shape. These eight images specifically represent sub weapons or items. Hereinbelow, these images are generally referred to as "item icons" 105. In the present embodiment, an item icon 105a representing a "bomb" is displayed at the top, and then item icons105b to 105h representing a "vase," a "boomerang," a "hook," a "slingshot," a "lyre," a "magnifying glass," and "bow and arrow" are displayed in this order clockwise. In addition, at the substantially center of the screen, a central icon 103 is displayed. This icon indicates that the B button 32i is pressed. Further, an instruction icon 104 is also displayed which is connected with a string like object extending from the central icon 103 toward the upper left direction. Still further, a circle 106 is displayed such that the center thereof corresponds to the screen center. The instruction icon is displayed at various positions depending on the attitude of the input device 8. For example, when the input device 8 is in an attitude such that the front end thereof is pointed to the upper right as a result of movement of the input device by the player (i.e., the player points the front end of the input device 8 to the upper right), the instruction icon 104 is moved to and displayed at a predetermined position on the upper right side of the central icon 103 (where to be displayed will be described later in detail).

Figure 10:
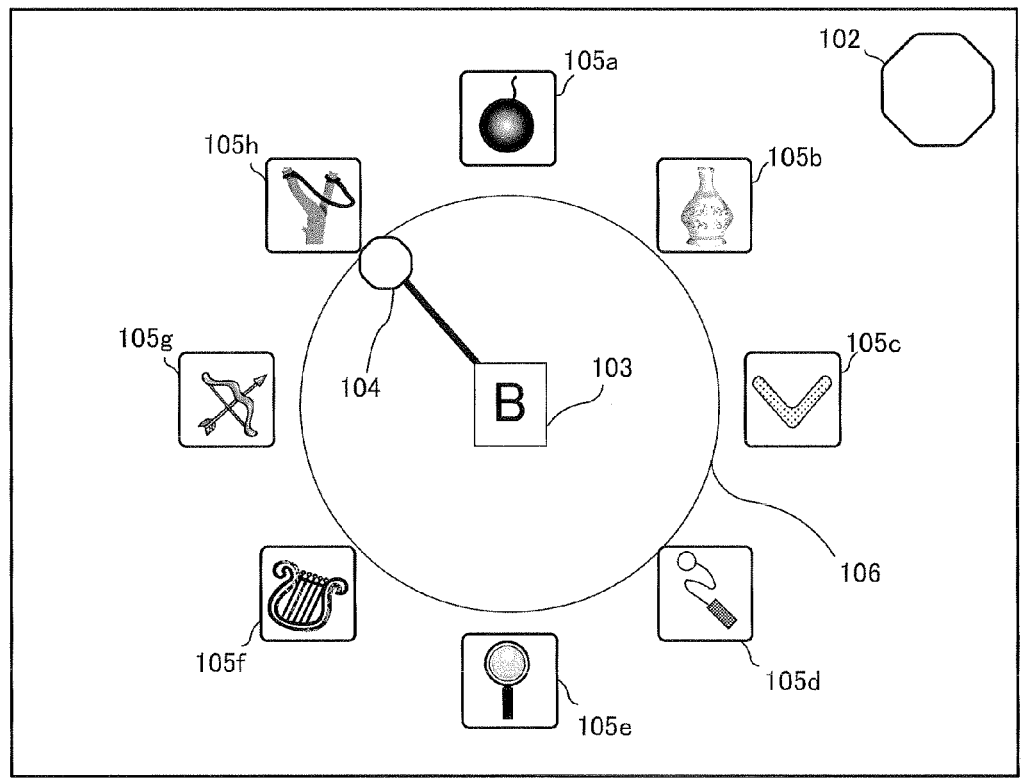
FIG. 10 is an example of an operation in the item selection screen.
Figure 11:
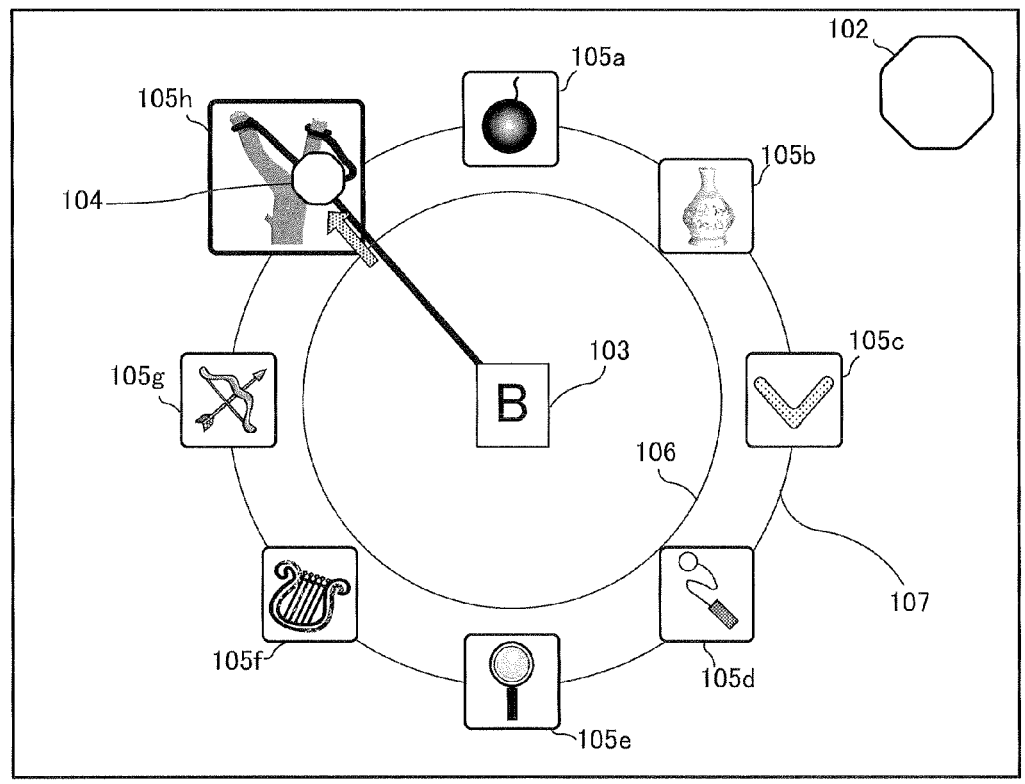
FIG. 11 is an example of an operation in the item selection screen.

When the instruction icon 104 is overlaid onto any of the item icons 105, an item can be selected. For example, in the state shown in FIG. 9, an operation of selecting the item icon 105h will be assumed. Initially, the player performs an operation of pointing the front end (the side where the imaging information calculation section 35 is provided) of the input device 8 to the upper left (i.e., changes the attitude of the input device 8). Accordingly, the instruction icon 104 is moved to the upper left, and reaches a position close to the outer circumference of the circle 106 as shown in FIG. 10. As shown in FIG. 11, the instruction icon 104 then moves automatically as if it absorbs to the item icon 105h, and the item icon 105h is displayed enlarged. This is the state where the item icon 105h has been selected. Further, in FIG. 11, a circle 107 that is slightly larger than the circle 106 is displayed. The circle 107 is displayed only in the state where the item icon 105 is selected.

Figure 12:
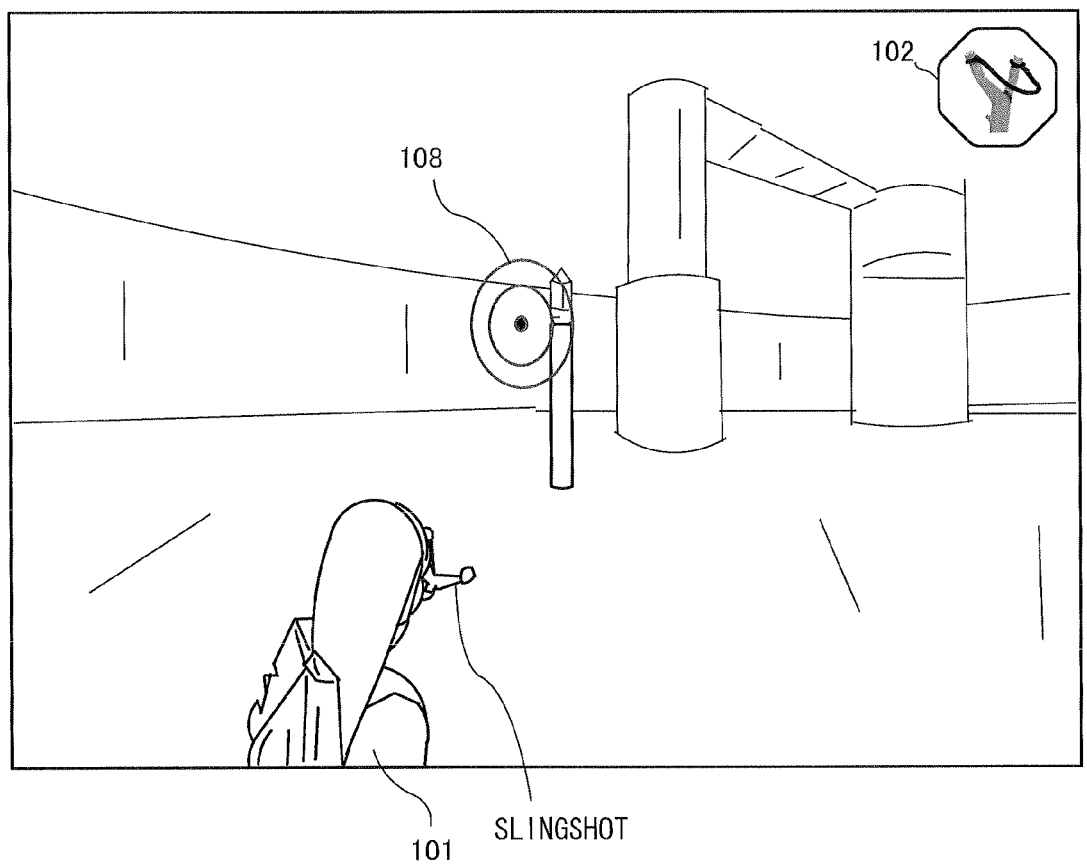
FIG. 12 is an example of a game screen assumed in this embodiment.

When the player releases his/her finger from the B button 32i in this state, the player object 101 gets equipped with a sub weapon represented by the item icon 105h, a slingshot in this case, and as shown in FIG. 12, the player object 101 holding up a slingshot is displayed. In this case, an image of the slingshot is displayed as the armament icon 102, thereby to indicate that the player object 101 is equipped with the slingshot as the sub weapon. Further, in the screen, an aim object 108 is displayed in the direction straight ahead of the player object 101. If the player releases his/her finger from the B button 32i, and then immediately presses the A button, the player object 101 is caused to launch a bullet from the slingshot toward the aim object 108. That is, If the player presses the A button 32d for example while the front end of the input device 8 is kept pointed to the upper left after the player's releasing his/her finger from the B button without changing the attitude of (without re-orienting) the input device 8, the bullet of the slingshot can be launched toward the direction straight ahead of the player object 101. As a result, an operation for item selection operation and the subsequent operation for item use can be performed speedily.

Figure 13:
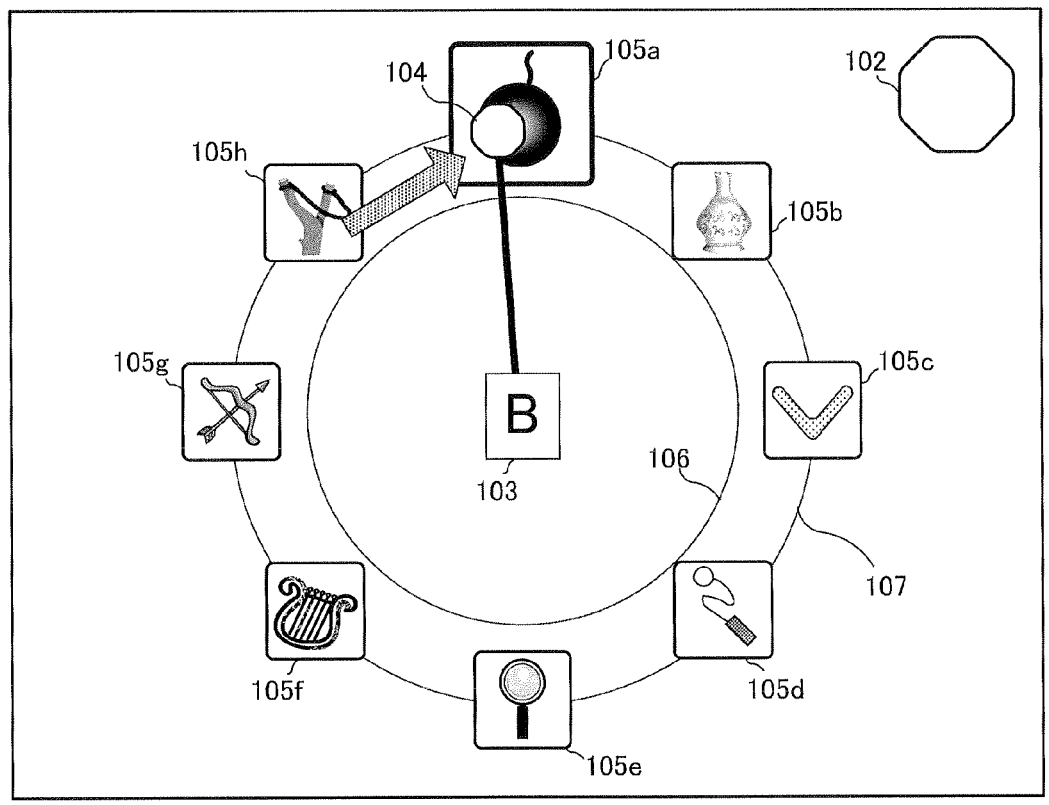
FIG. 13 is an example of an operation in the item selection screen.

Here, the operation in the state where an item is selected will be described. Assume an operation of selecting for example the item icon 105a, which is right adjacent to the item icon 105h, in a state where the item icon 105h is selected (the state where the front end of the input device is pointed to the upper left), as shown in FIG. 11. In this case, when the input device 8 is moved such that the front end is oriented upward, the instruction icon 104 is moved to the upper right from the 105h, as shown in FIG. 13, and the item icon 105a is selected.

Figure 14:
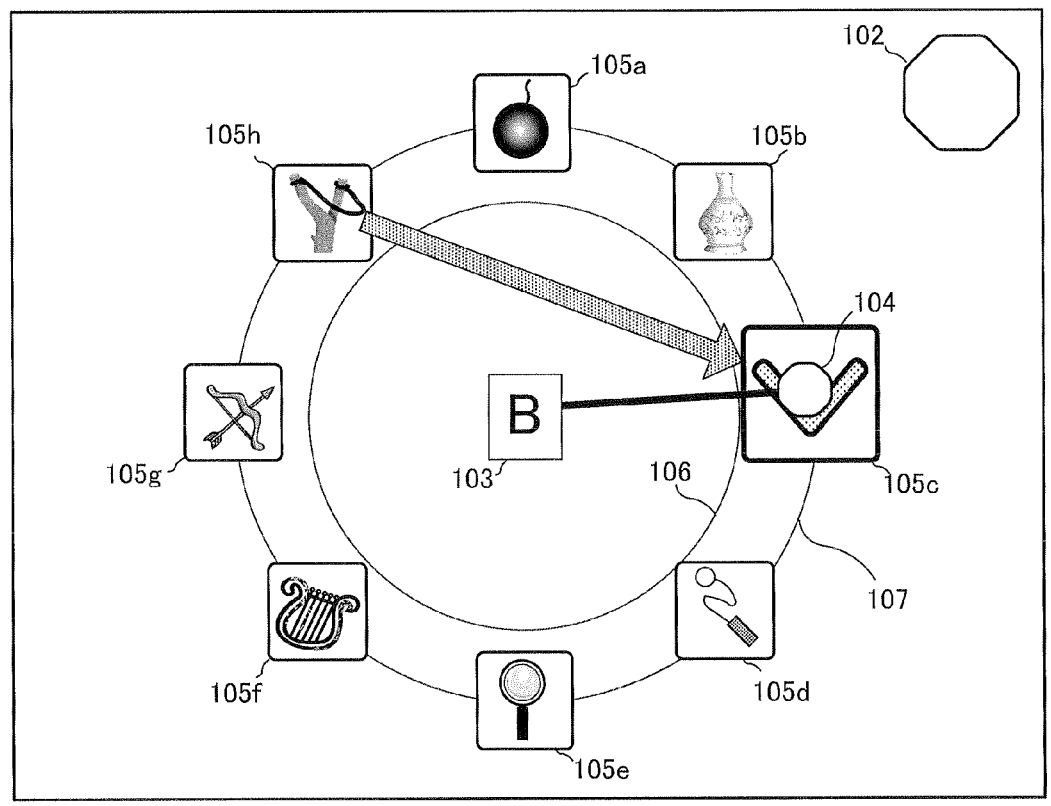
FIG. 14 is an example of an operation in the item selection screen.

Further, assume a case where the item icon 105c is to be selected from the state shown in FIG. 11. In this case, when the player moves the input device 8 so as to point the front end thereof to the right, the instruction icon 104 can be moved to the position of the item icon 105c as shown in FIG. 14. That is, it is possible to select the item icon 105c directly from the position of the item icon 105h instead of through a movement of the instruction icon 104 from the item icon 105h to 105b in this order clockwise and then selection of the item icon 105c. Accordingly, an intuitive speedy selection operation can be performed.

Further, in a selection state where any of the item icons is selected, it is also possible to cancel the selection state by performing an operation of pointing the front end of the input device 8 to the screen center. In other words, when the attitude of the input device is returned to the reference attitude from the selection state where an item icon is selected (including a case where the attitude of the input device is, to a certain degree, close to the reference attitude), it is possible to cancel the selection state.

Figure 15:
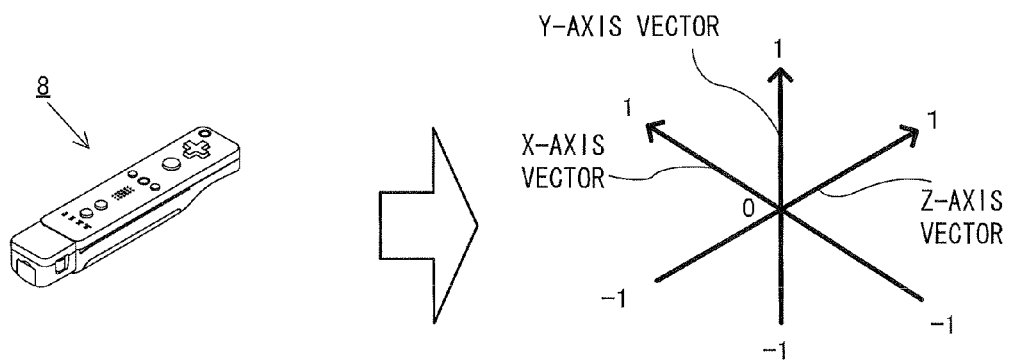
FIG. 15 is a diagram illustrating a reference attitude.
Figure 16:
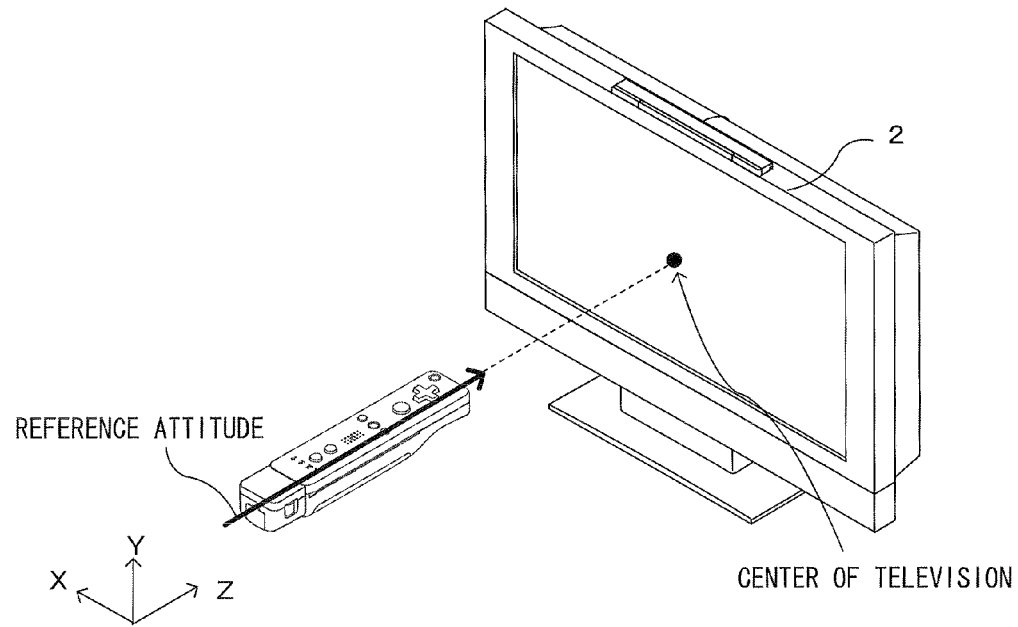
FIG. 16 is a diagram illustrating the reference attitude.

Subsequently, description will be made on an outline of the process for the above operation executed in the present embodiment. In the present embodiment, to realize the operation, an attitude called the "reference attitude" is set initially. In the present embodiment, the reference attitude is set by pointing the front end of the input device 8 to the center of the television 2, and orienting the button surface thereof upward. In the present embodiment, as shown in FIG. 15, the attitude of the input device 8 is regarded as three axial vectors in a local coordinate system, in which the direction which the front end of the input device 8 is pointed to is set as the Z-axis positive direction, the direction which the button surface thereof faces is set as the Y-axis positive direction, and the direction which the left side surface thereof faces is set as the X-axis positive direction. However, in the following description, for the sake of easy understanding, the attitude of the input device 8 is represented by an arrow along the Z-axis direction only shown in FIG. 15. As a result, the reference attitude is represented by the arrow along the Z-axis shown in FIG. 16.

Figure 17:
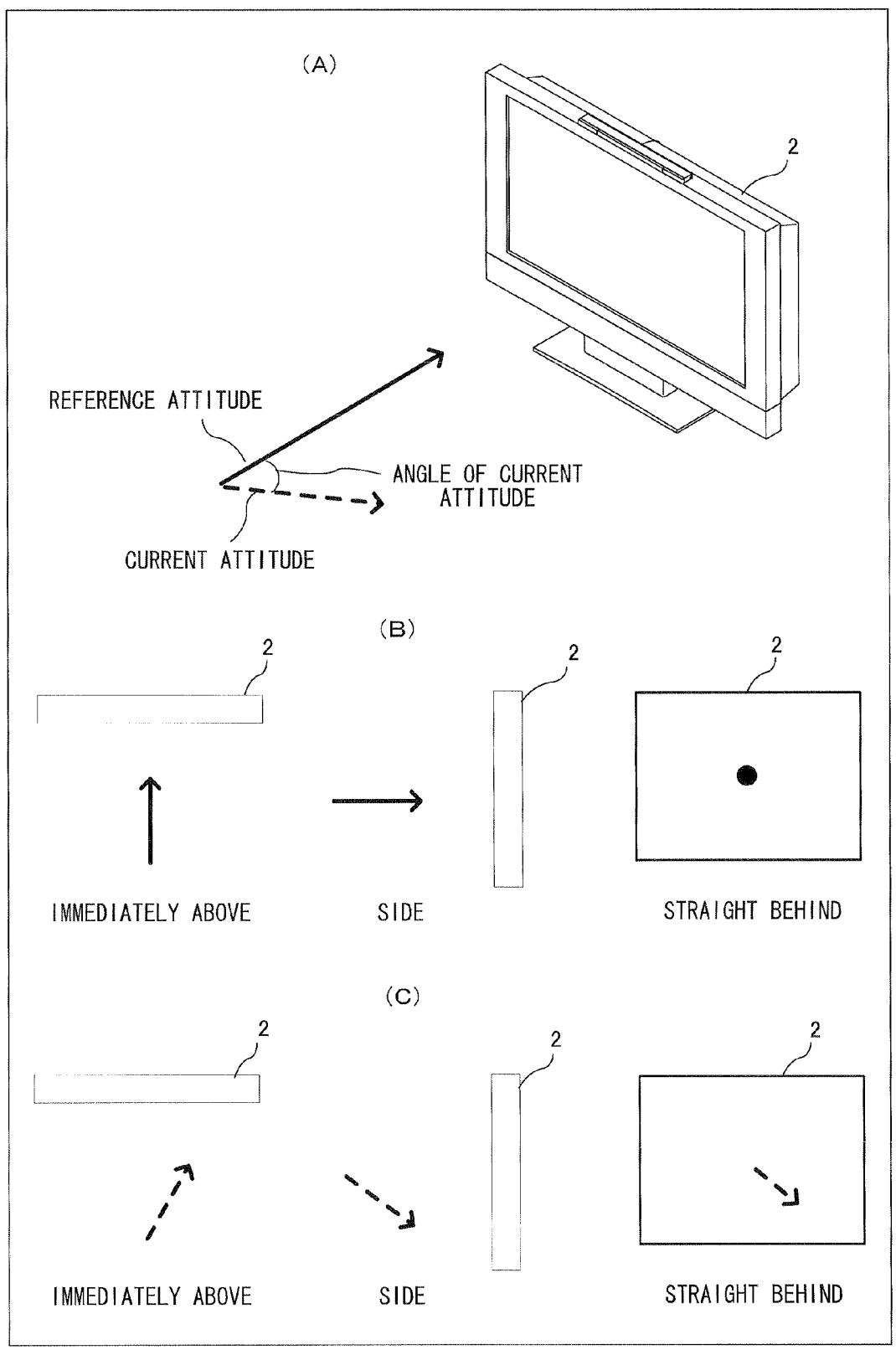
FIG. 17 is a diagram illustrating the relation between the reference attitude and a current attitude.

As described above, the item selection process is performed by performing a process described below while using, as the reference attitude, the attitude in which the front end of the input device 8 is pointed to the center of the television 2. The processing in the present embodiment described below is repetitively performed in a frame unit (1/60 sec.) basically. Initially, based on the angular velocities obtained from the gyro-sensor unit 7, the attitude of the input device 8 in respective frames is calculated as a "current attitude." The angle of the current attitude relative to the reference attitude is then calculated. For example, FIG. 17 shows a case where the input device 8 is tilted to the lower right relative to the reference attitude. FIG. 17(A) is a perspective view illustrating the relation between the reference attitude and the current attitude. FIG. 17 (B) schematically illustrates states of the reference attitude in FIG. 17(A) as viewed from directly above, from the side, and from straight behind. FIG. 17(C) schematically illustrates states of the current attitude in FIG. 17(A) as viewed from directly above, from the side, and from straight behind. As shown in FIG. 17, the angle of the current attitude is represented as an angle between an arrow representing the reference attitude and an arrow representing the current attitude. In other words, the angle is represented by an angle obtained by combining the change in the attitude in the X-axis direction and that in the Y-axis direction.

Upon calculation of the angle of the current attitude, the direction of the current attitude is calculated. The "direction of the current attitude" is the direction of the current attitude relative to a plane perpendicular to the reference attitude direction (corresponding to the screen of the television 2 in the present embodiment). Based on the angle and the direction, an item icon 105 is selected.

Here, the angle of the current attitude in relation to the selection of any of the item icons 105 will be described. In the present embodiment, the circle 106 shown in FIG. 9 or the like is displayed in the selection screen, and the center of the circle 106 corresponds to 0 degrees of the angle of the current attitude above calculated. The outer circumference of the circle 106 corresponds to 12 degrees of the angle of the current attitude (see FIG. 18). That is, in the case where the input device 8 is in the reference attitude, the angle of the current attitude is 0 degrees, whereas in the case where the input device 8 is tilted 12 degrees relative to the reference attitude, the front end of the input device 8 is pointed to any point on the outer circumference of the circle 106. In the present embodiment, when the angle is 12 degrees or more, one of the item icons 105 is selected based on the direction of the current attitude to be described below.

Figure 19:
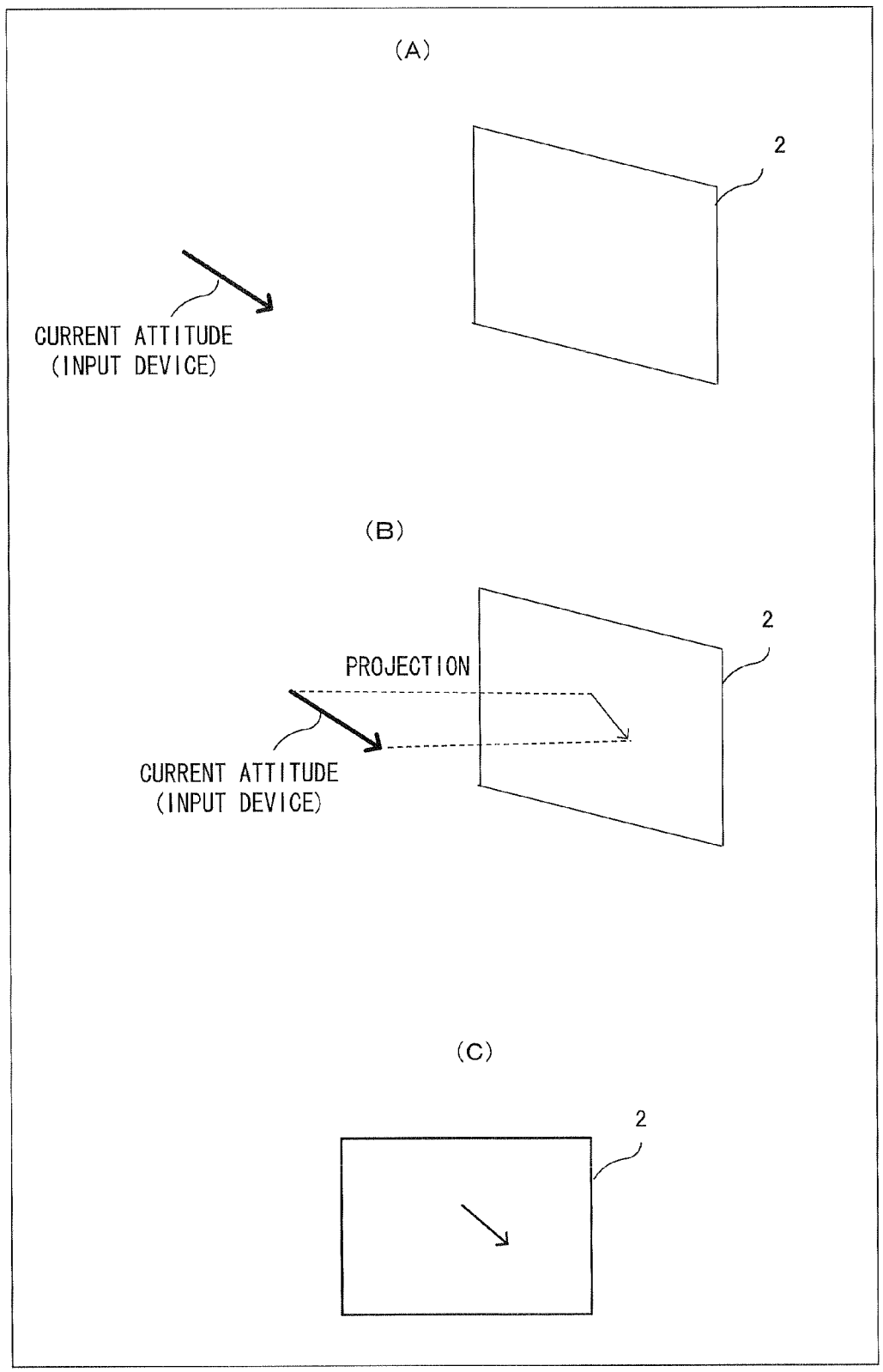
FIG. 19 is a diagram illustrating a direction of the current attitude.

Subsequently, the direction of the current attitude will be described. As to the calculation of the direction of the current attitude, as shown in FIG. 19, a vector (FIG. 19(B)) obtained by projecting the current attitude (FIG. 19(A)) on the screen is calculated, whereby the direction of the current attitude (FIG. 19(C)) is calculated.

Figure 20:
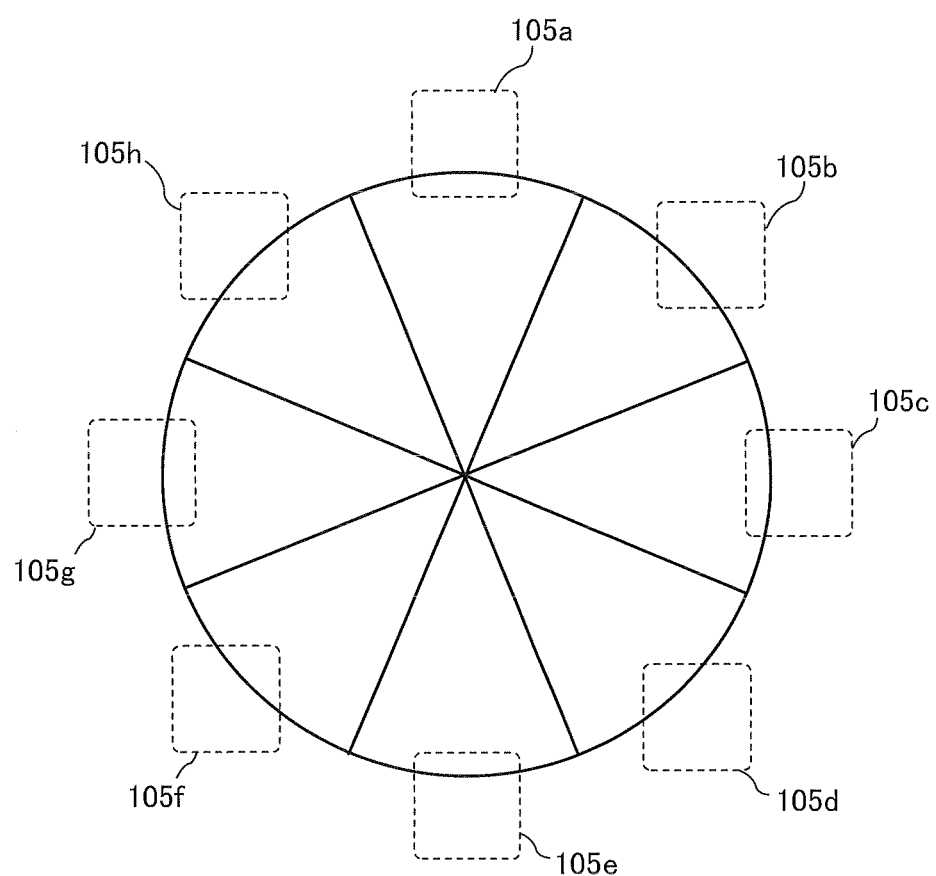
FIG. 20 is a schematic view illustrating a concept of a table for item selection decision.

Here, in the present embodiment, a table for item selection decision is defined in advance in which the arrangement of the item icons 105 in the selection screen is associated with the direction of the current attitude. FIG. 20 is a diagram schematically illustrating the table for item selection decision. In FIG. 20, a circle region having the center of the screen set as it center point is defined, and is divided into eight regions depending on the number (8) of the item icons 105. In other words, the circle region is divided into eight directions with the center point of the screen being set as the origin, and the eight item icons 105 are associated with the eight directions, respectively. When the direction of the current attitude is calculated as described above, an item icon 105 associated with the direction of the current attitude is selected based on the table for decision. That is, in the present embodiment, when the attitude of the input device is detected to be tilted 12 degrees or more relative to the reference attitude, an item icon 105 corresponding to the direction of the input device 8 will be selected.

Further, in the case where the angle of the current attitude decreases to seven degrees or less from the state where an item icon 105 has been selected, the selection state is cancelled. That is, when the attitude of the input device comes closer to the reference attitude to a certain degree from the item selection state, the selection state is cancelled.

Further, in the present embodiment, the above instruction icon 104 is displayed for the sake of easy-to-understand explanation of a current operation to the player. An outline of a process of determining the display point of the instruction icon will be described. Initially, as shown in FIG. 18, the circle 106 is associated with the angle of the input device. Specifically, the radius of the circle 106 is set so as to define the following correspondence in advance. That is, the center of the circle 106 corresponds to 0 degrees of the angle of the current attitude, and any point on the outer circumference corresponds to 12 degrees of angle of the current attitude (note that when the angle of the current attitude has increased to more than 12 degrees, the increased angle is always regarded as 12 degrees). In the following description, the circle 106 is referred to as a first scale circle 106, or simply referred to as a first scale. With this definition of correspondence, the distance (a position on the radius) from the center of the circle 106 to a point corresponding to the above calculated angle of the current attitude is calculated. Based on the distance from the center and the direction of the current attitude, a display point of the instruction icon 104 is determined.

Figure 21:
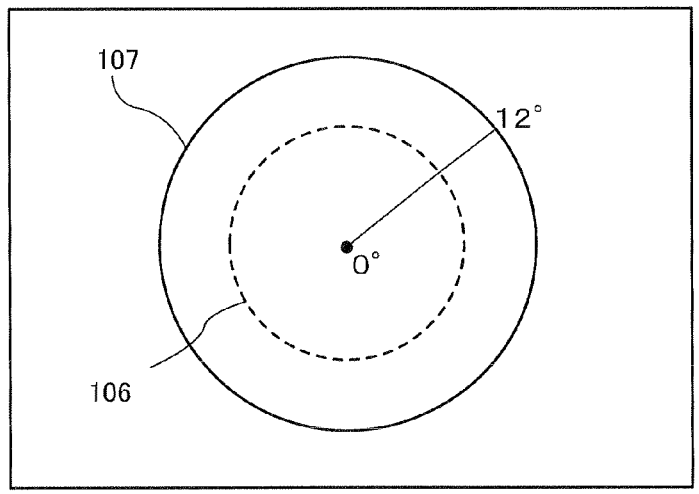
FIG. 21 is a diagram illustrating a second scale circle.

Here, in order to cause the instruction icon 104 to move as if it absorbs to the item icon 105 as shown in FIG. 11, in the present embodiment, the following process is also performed. As described above, when the angle of the current attitude is 12 degrees or more, selection of an item icon is performed. On the other hand, when the angle is less than 12 degrees, the first scale circle 106 is used to determine the display point of the instruction icon 104. When the angle of the current attitude is 12 degrees or more, the above circle 107 having a radius greater than that of the first scale circle 106 is used to determine the display point of the instruction icon 104. Hereinbelow, the circle 107 may be referred to as a second scale circle. FIG. 21 is a diagram illustrating the relation between the first scale circle 106 and the second scale circle 107. As shown in FIG. 21, with respect to the second scale circle 107, the following correspondence is set. That is, the center of the second scale circle 107 corresponds to 0 degrees of the angle of the current attitude, and any point on the outer circumference corresponds to 12 degrees of the angle of the current attitude. However, the radius of the second scale circle 107 is larger than that of the first scale circle 106. So, when the angle of the current attitude is 12 degrees, for example, the display point of the instruction icon 104 varies depending on which of the first scale circle 106 and the second scale circle 107 is applied (note that in the present embodiment, the radius of the second scale circle is set such that the outer circumference of the second scale circle passes through the middle points of the respective item icons 105). That is, in the case where the angle of the current attitude is 12 degrees, the instruction icon 104 is displayed at the outer side when the second scale circle 107 is applied than when the first scale circle 106 is applied. Thus, in the present embodiment, under a state where any of the item icons 105 is yet to be selected, when the angle of the current attitude is less than or equal to 12 degrees, the display point of the instruction icon is determined by using the first scale circle 106, whereas when the angle of the current attitude exceeds 12 degrees and any of the item icons 105 is being selected, the display point of the instruction icon is determined by using the second scale circle 107 instead of the first scale circle 106. As a result, as shown in FIG. 10 and FIG. 11, when the instruction icon 104 reaches any point on the outer circumference of the circle 106, a motion as if the instruction icon 104 absorbs to the item icon 105 is rendered.

Subsequently, an explanation will be made on an outline of a process of moving the instruction icon 104 under a state where any of the item icons 105 is selected. Specifically, an explanation will be made on an outline of a process performed when the instruction icon 104 is moved between adjacent item icons105 during item icon selection. For example, described is a case where the item icon 105a is selected, and the instruction icon is to be moved toward the right adjacent item icon 105b.

Figure 22:
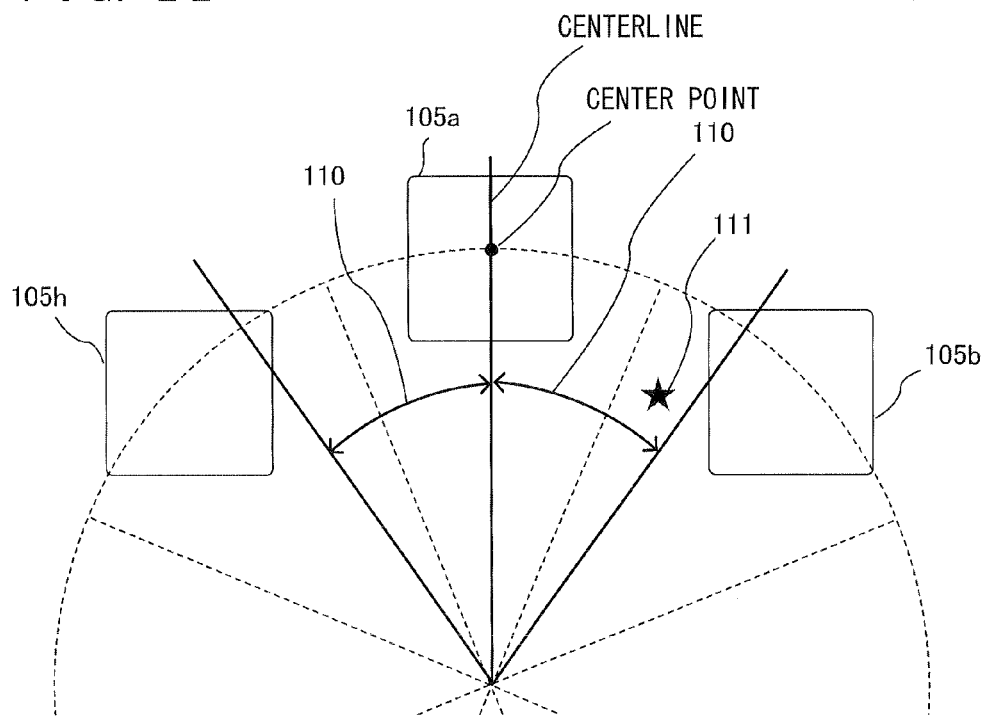
FIG. 22 is a diagram illustrating a selection decision while an item icon is being selected.

Initially, for each item icon 105, a centerline extending from the center of the screen through the middle point of the item icon is set as the reference, and predetermined angles are set to the right and left of the centerline. For example, in the case of item icon 105*a*, predetermined angles 110 are set on both the right and left sides of the centerline which is a reference line extending from the center of the screen through the middle point of the item icon 105*a*, as shown in FIG. 22. The angles are set such that a sector-shaped region including the angles 110 on the right and left is wider than the region (region defined by dotted lines in FIG. 22) corresponding to the table for item selection decision shown in FIG. 20 (hereinafter, the region including the angles 110 on the right and left may be referred to as an item-in-selection region). Under the state where the item icon 105*a* is selected, as long as the position of the instruction icon 104 stays within the item-in-selection region (a range defined by the angles 110), the item icon 105*a* is continuously selected.

As a result, in the case where the instruction icon 104 is located at a position where the item icon 105*b* would be selected on the basis of the table for item selection decision as described above (e.g., at a position 111 in FIG. 22), the item icon 105*b* will not be selected, and the item icon 105*a* is continuously selected. While the item icon 105*a* is being selected, selection of the item icon 105*a* will not be cancelled until the instruction icon 104 is moved to the outside the range of the angles 110. Upon the cancellation, the item selection decision for selecting one of the item icons 105 is then performed based on the table for item selection decision as the reference. Further, angles are set for item icons 105*b* and 105*h*, for example, in the same manner as above. In other words, the range of the angles for an item icon overlaps with that of its adjacent item icon, and in the overlapped portion, an item icon 105 which is being selected is preferentially selected (a current selection state is hardly cancelled). With this process, it is possible to prevent the instruction icon 104 from moving twitchily between two adjacent item icons 105 at around their boundary.

Figure 23:
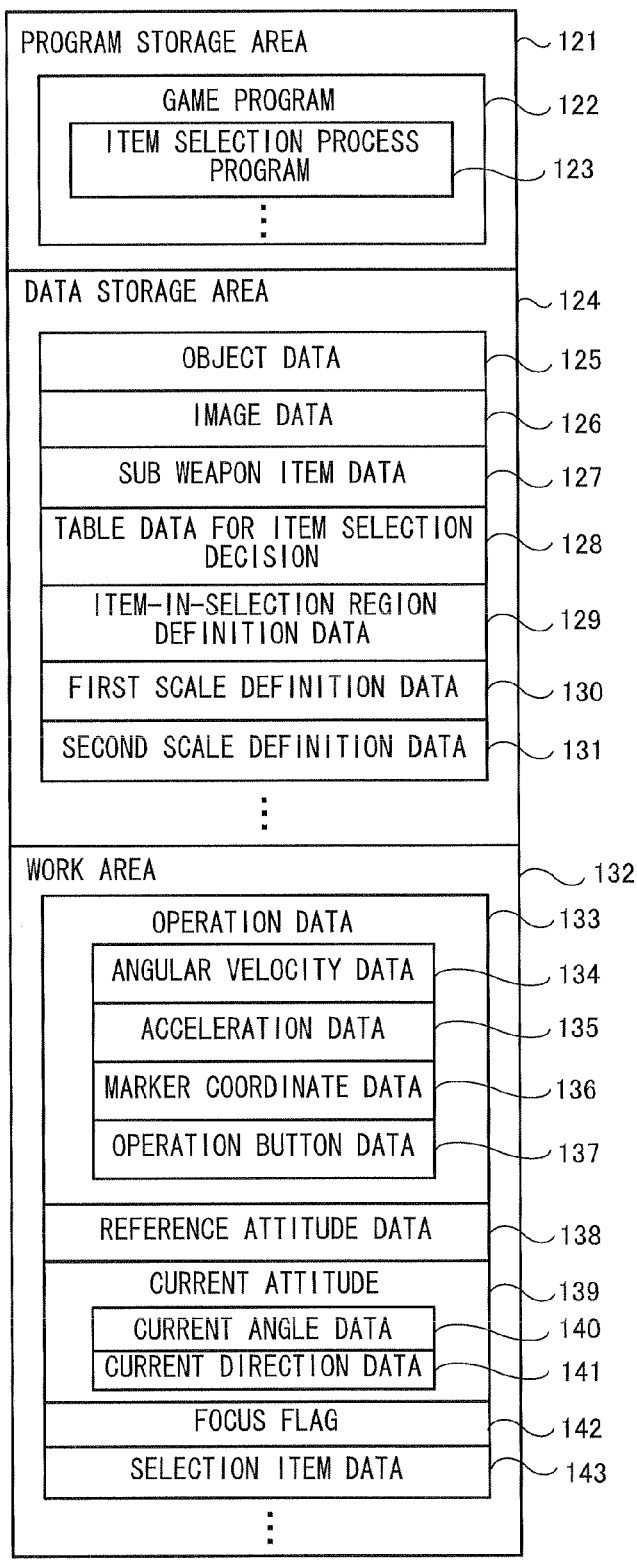
FIG. 23 is a diagram illustrating a memory map of an external main memory 12.

Subsequently, the game processing executed by the game apparatus 3 will be described in detail. Initially, data which is stored in the external main memory 12 in the game processing will be described. FIG. 23 is a diagram illustrating a memory map of the external main memory 12 (may be the internal main memory 11*e*, or may be both the external and internal main memories) shown in FIG. 3. In FIG. 23, the external main memory 12 includes a program storage area 121, a data storage area 124, and a work area 132. Data in the program storage area 121 and in the data storage area 124 corresponds to data previously stored in the disk 4 and copied to the external main memory 12 upon game processing according to the present embodiment.

Note that, the programs and data may be provided, other than the above disk 4, in the form of a storage medium such as a cartridge type ROM, a memory card, or a hard disk, or may be provided by downloading from a predetermined server or a game device through a wired network or a wireless network, (that is, download programs and data may be stored in the external main memory 12).

Stored in the program storage area 121 is a game program 122 executed by the CPU10, and the game program 122 includes for example an item selection process program 123. The item selection process program 123 is a program for executing the above item selection process.

Stored in the data storage area 124 is data such as object data 125, image data 126, sub weapon item data 127, table data for item selection decision 128, item-in-selection region definition data 129, first scale definition data 130, and second scale definition data 131.

The object data 125 is data (e.g., polygon model data) of various objects, such as the above player object 101, appearing during a game. The image data 126 is data of textures pasted on the objects.

The sub weapon item data 127 is data defining the details of the sub weapons and items (e.g., motions and effects thereof). The sub weapon item data 127 also includes data representing the correspondence between these and the item icons 105.

The table data for item selection decision 128 is data of the table representing the details shown in FIG. 20. That is, the data represents the definition of the correspondence between the respective item icons 105 arranged on the screen and the attitude of the input device 8 (the direction of the current attitude).

The item-in-selection region definition data 129 is data representing the definition of a range (range defined by the angles 110 in FIG. 22) for determining, in a state where any of the item icons 105 is being selected, that the item icon 105 is being selected, as described with reference to FIG. 22.

The first scale definition data 130 is data corresponding to the first scale circle 106 described above with reference to FIG. 18. Further, the second scale definition data 131 is data corresponding to the second scale circle 107 described above with reference to FIG. 21. That is, both the first and second scale definition data represents the definition of the correspondence between the current angle of the input device 8 and the position on the screen (the display point of the instruction icon 104).

Stored in the work area 132 is various data temporarily generated and used during game processing. Specifically, operation data 133, reference attitude data 138, current attitude data 139, focus flag 142, selection item data 143, and the like are stored therein.

The operation data 133 is operation data which is transmitted to the game apparatus 3 from the input device 8. As described above, since the operation data is transmitted once every 1/200 sec. to the game apparatus 3 from the input device 8, the operation data 133 stored in the external main memory 12 is updated at this rate. In the present embodiment, only the latest (most recently acquired) operation data may be stored in the external main memory 12.

The operation data 133 includes angular velocity data 134, acceleration data 135, marker coordinate data 136, and operation button data 137. The angular velocity data 134 is data representing angular velocities detected by the gyro-sensors 55 and 56 in the gyro-sensor unit 7. Here, the angular velocity data 134 represents angular velocities about the three XYZ axes shown in FIG. 3. The acceleration data 135 is data representing acceleration (acceleration vector) detected by the acceleration sensor 37. Here, the acceleration data 135 represents a three-dimensional acceleration vector containing acceleration components along the three XYZ axes shown in FIG. 3.

The marker coordinate data 136 is data representing a coordinate point, that is, the above marker coordinate point, calculated by the image processing circuit 41 in the imaging information calculation section 35. The marker coordinates is represented in a two-dimensional coordinate system for representing a position on a plane corresponding to a picked up image. In the case where an image of the two markers 6R and 6L is picked up by the image pickup element 40, two marker coordinate points are calculated. Meanwhile, in the case where one of the markers 6R and 6L is not located within the area in which an image is picked up by the image pickup element 40, an image of only one marker is picked up by the image pickup element 40, and only one marker coordinate point is calculated. Further, in the case where neither of the markers 6R and 6L are located in the area in which an image is picked up by the image pickup element 40, no image of the markers is picked up by the image pickup element 40, and thus no marker coordinate point is calculated. Accordingly, the marker coordinate data 136 may represent two marker coordinate points, one marker coordinate point, or no marker coordinate point.

The operation button data 137 is data representing the input state of each of the operation buttons 32a to 32i.

The reference attitude data 138 is data representing the above reference attitude.

The current attitude data 139 is data representing the above current attitude, and includes current angle data 140 and current direction data 141. The current angle data 140 is data representing the angle of the current attitude relative to the reference attitude. The current direction data 141 is data representing the direction of the current attitude relative to a plane perpendicular to the reference attitude direction (corresponding to the screen of the television 2 in the present embodiment).

The focus flag 142 is a flag representing whether or not any of the item icons 105 is being selected. When the flag is set OFF, no item icon 105 is being selected, whereas when the flag is set ON, any one of the item icons 105 is being selected.

The selection item data 143 is data representing an item or a sub weapon being currently selected.

Figure 24:
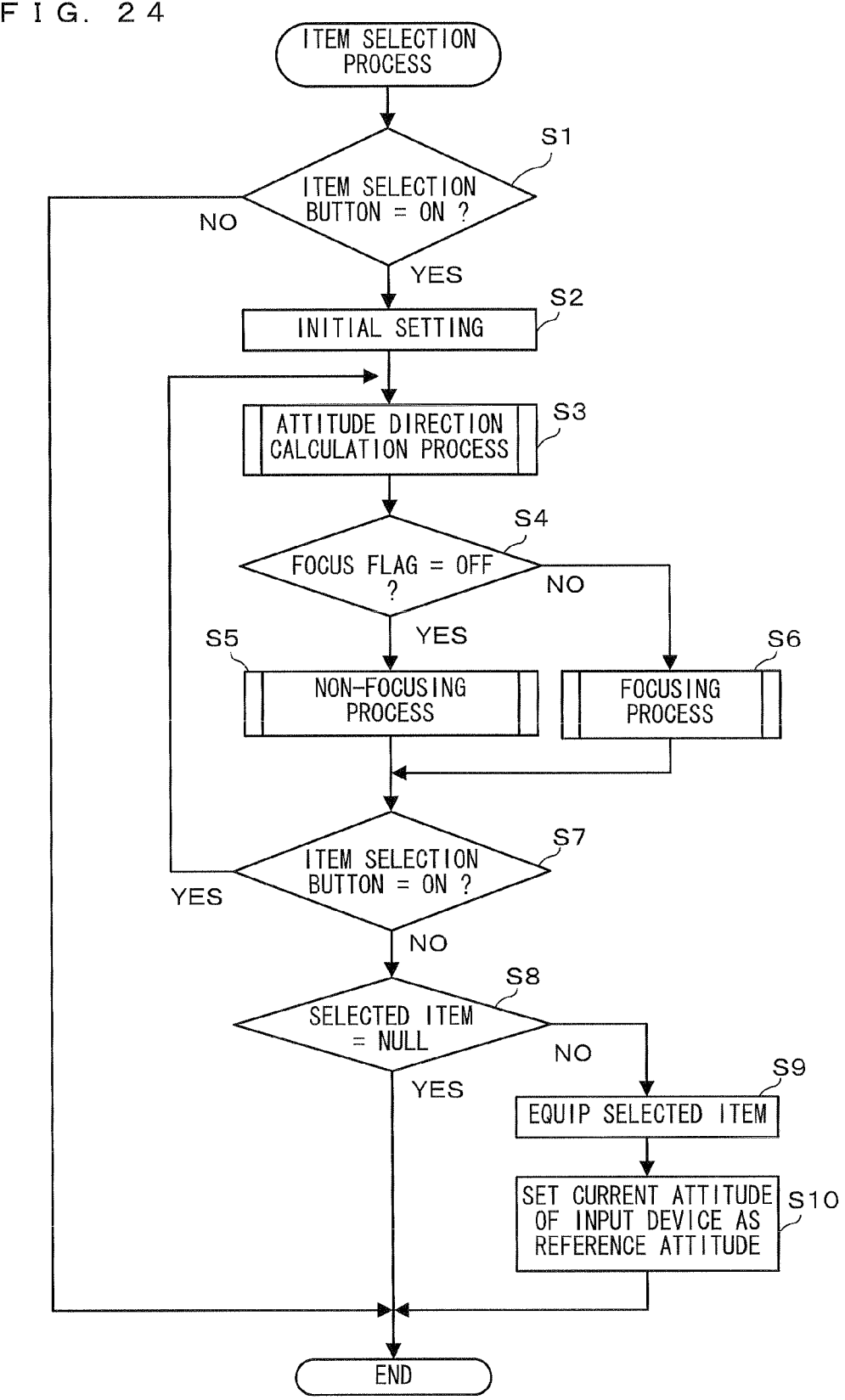
FIG. 24 is a flowchart showing an item selection process in detail.

Subsequently, with reference to FIG. 24 to FIG. 27, the item selection process executed by the game apparatus 3 will be described in detail. When the game apparatus 3 is powered on, the CPU 10 of the game apparatus 3 executes a boot program stored in the ROM/RTC 13, so as to initialize the respective units such as the external main memory 12. The game program stored in the optical disc 4 is loaded to the external main memory 12, and the CPU 10 starts to execute the game program. The flowchart shown in FIG. 24 shows game processing when the above sub weapon or item is selected. That is, after a game starts, when an operation for item selection is performed, the processes in the flowchart shown in FIG. 24 are executed. Note that in the present embodiment, the game processing relating to a situation other than the operation of selecting the sub weapon/item is not directly relevant to the present invention, and thus description thereof is omitted. In addition, a processing loop from step S3 to step S7 shown in FIG. 24 are repetitively executed in each frame.

In FIG. 24, initially in step 51, with reference to the operation button data 137, the CPU 10 determines whether or not the item selection button is ON. Specifically, whether or not the B button 32i is pressed is determined. As a result of the determination, when the item selection button is not ON (NO in step S1), this process ends.

On the other hand, when it is determined that the item selection buttons is ON (YES in step S1), the initial setting for the item selection process will be executed in step S2. The process in step S2 will be described more specifically. The CPU10 initially sets the focus flag 142 OFF. Further, the CPU10 sets a NULL value (value indicating no item/sub weapon is selected) to the selection item data 143. Still further, a process of generating and displaying the item selection screen shown in FIG. 9 is executed.

Figure 25:
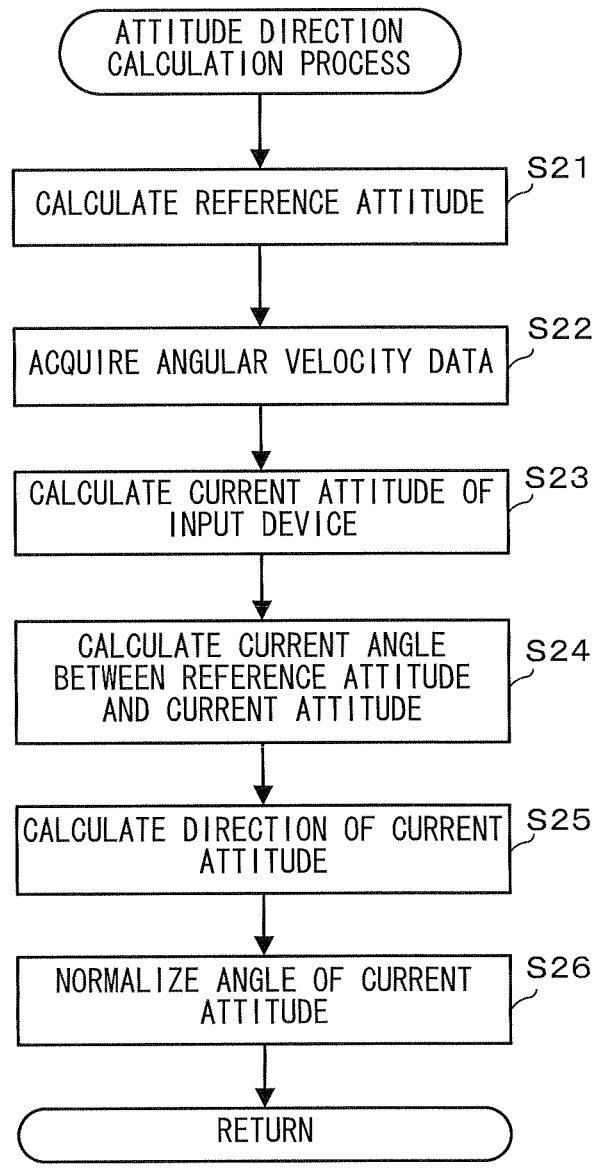
FIG. 25 is a flowchart showing, in detail, an attitude direction calculation process shown in step S3 of FIG. 24.

Subsequently, in step S3, the attitude direction calculation process is executed. The process is a process of calculating the current attitude of the input device. FIG. 25 is a flowchart showing in detail the attitude direction calculation process shown in step S3. Initially, in step S21, the reference attitude is calculated and set to the reference attitude data 138. Here, the attitude of the input device 8, in which the front end thereof is pointed to the center of the television 2 and the button surface thereof faces upwardly, as described with reference to FIG. 16 or the like, is calculated and set to the reference attitude data 138.

Subsequently, in step S22, the angular velocity data 134 is acquired from the gyro-sensor unit 7. In the subsequent step S23, based on the angular velocity data 134, the current attitude of the input device is calculated. Further, in step S24, the angle of the current attitude relative to the reference attitude set in above step S21 is calculated.

Subsequently, in step S25, the direction of the current attitude, as described above with reference to FIG. 19, is calculated, and stored in the current direction data 141.

Subsequently, in step S26, normalization of the angle of the current attitude is performed so that the angle of the current attitude stays in a range from 0 to 12 degrees. Specifically, when the angle of the current attitude is 12 degrees or more, the angle is stored uniformly as 12 degrees in the current angle data 140. This is the end of the description of the attitude direction calculation process.

With reference back to FIG. 24, subsequently to the attitude direction calculation process, in step S4, whether or not the focus flag 142 is set OFF is determined. That is, whether or not any or the item icons is being selected is determined. As a result of the determination, when the focus flag 142 is set OFF (YES in step S4), the non-focusing process will be executed in step S5.

Figure 26:
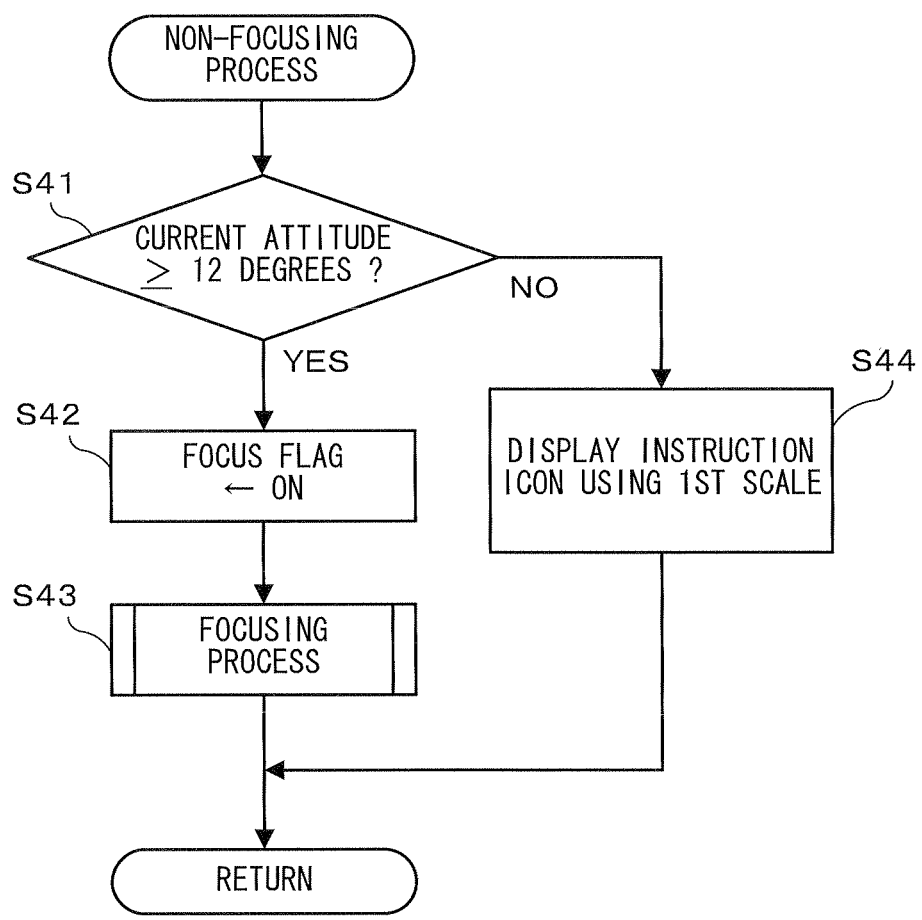
FIG. 26 is a flowchart showing, in detail, a non-focusing process shown in step S5 of FIG. 24.

FIG. 26 is a flowchart showing in detail the non-focusing process indicated in step S5. Initially, in step S41, with reference to the current angle data 140, the CPU 10 determines whether or not the current angle is 12 degrees or more. As a result of the determination, when the angle is not 12 degrees or more (NO in step S41), the display point of the instruction icon 104 is determined by using the first scale definition data 130 in step S44, and the instruction icon 104 is then displayed at the determined position. Thereafter, the non-focusing process ends.

Note that the first scale definition data 130 is used in the present embodiment. However, the display point of the instruction icon 104 may be calculated by using a function equivalent to the first scale.

Meanwhile, as a result of the determination in step S41, when the current angle is 12 degrees or more (YES in step S41), the focus flag 142 is then set ON in step S42. Subsequently, in step S43, a focusing process described later is executed and the non-focusing process ends.

With reference back to FIG. 24, upon ending of the non-focusing process, the processing proceeds to subsequent step S7. Meanwhile, as a result of determination in above step S4, when the focus flag 142 is not OFF (NO in step S4), which means any of the item icons 105 is being selected, the focusing process is executed in step S6.

Figure 27:
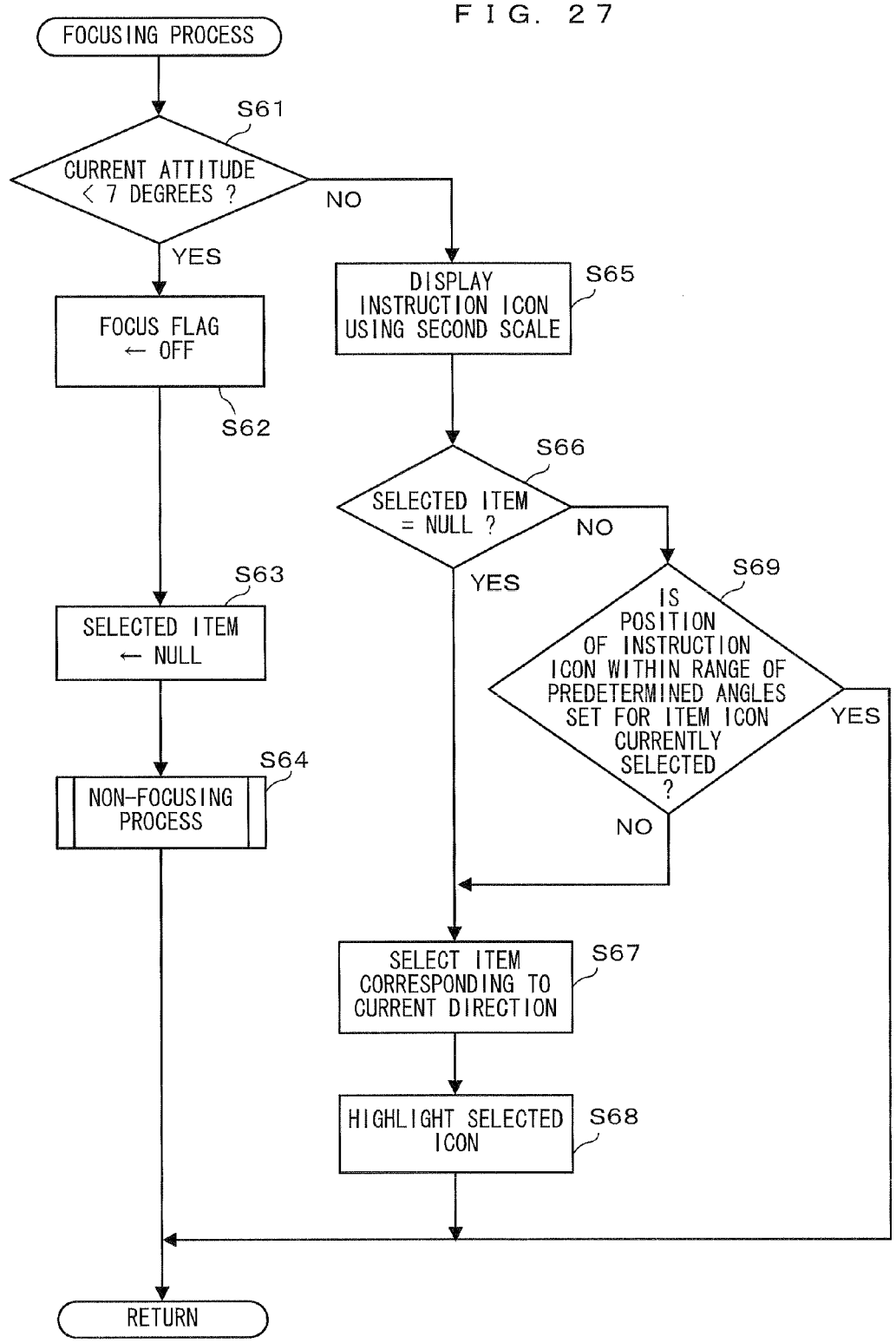
FIG. 27 is a flowchart showing, in detail, a focusing process shown in step S6 of FIG. 24.

FIG. 27 is a flowchart showing, in detail, the focusing process indicated in step S6. Initially, in step S61, whether or not the current angle is less than 7 degrees is determined. As a result, when the current angle is 7 degrees or less (YES in step S61), the current attitude is considered to have been changed relatively closer to the reference attitude as compared to the attitude at the time when the item icon 105 is selected. Thus, in this case, a process (process for selection cancellation) is executed for changing from the selection state where any of the item icons 105 is selected to a non-selection state. Specifically, the focus flag 142 is set OFF in step S62 initially, and a NULL value is set to the selection item data 143 in step S63 subsequently.

In subsequent step S64, the above non-focusing process is executed (and as a result, the display point of the instruction icon 104 is determined by using the first scale). Thereafter, the focusing process ends.

Meanwhile, as a result of the determination in step S61, when the current angle is no less than 7 degrees (NO in step S61), the display point of the instruction icon 104 is determined in step S65 subsequently by using the above second scale definition data 131, and the instruction icon 104 is displayed at the determined position.

Subsequently, in step S66, whether or not the selection item data 143 is the NULL value is determined. That is, it is determined whether the non-selection state where the item icon 105 is not selected is switched to the selection state, or the selection state continues from the preceding frame. As a result of the determination, when the selection item data 143 is the NULL value (YES in step S66), the table data for item selection decision 128 is referred to in step S67, and an item icon 105 corresponding to the current direction is selected. Further, data representing a sub weapon or an item corresponding to the item icon 105 is stored in the selection item data 143.

In subsequent step S68, the size of the selected item icon 105 is enlarged, whereby highlighting of the selected item is performed. In this case, when an item icon 105 other than the selected item is highlighted, the highlighting is cancelled so as to be returned to the state before highlighting. Then, the focusing process ends.

Meanwhile, as a result of the determination in step S66, when the selection item data 143 is not the NULL value (NO in step S66), which means the selection state where the item icon 105 is selected continues from the previous frame, the item-in-selection region definition data 129 is referred to subsequently in step S69, and then it is determined whether the display point of the instruction icon 104 is included in the range of predetermined angles set for the item icon 105 currently selected. That is, as described with reference to FIG. 22, it is determined whether the instruction icon is moved between adjacent item icons 105 and whether selection cancellation is to be performed. As a result of the determination, when the display point of the instruction icon 104 is included in the range of the predetermined angles set for the item icon 105 currently selected (YES in step S69), the focusing process ends (that is, the selection state of the item icon 105 being selected does not change).

Meanwhile, when it is determined that the display point of the instruction icon 104 is not included in the range of the predetermined angles set for the item icon 105 being selected (NO in step S69), the processing proceeds to step S67. As a result, the selection state of the item icon 105 currently selected is cancelled, and its adjacent item icon 105 is newly selected. Then, the focusing process ends.

With reference back to FIG. 24, after completion of the non-focusing process or the focusing process, it is determined whether or not the item selection buttons is ON in subsequent step S7. As a result of the determination, when the item selection buttons is ON (YES in step S7), the processing is repeated after returning to step S3. That is, while the B button 32i is pressed, the item selection screen is continuously displayed, and the state where the item selection operation is available continues. Meanwhile, when it is determined that the item selection buttons is not ON (NO in step S7), it is determined whether or not the NULL value is set to the selection item data 143 in subsequent step S8. As a result, when the NULL value is set to the selection item data 143 (YES in step S8), which means no sub weapon or item is selected, the item selection process ends.

Meanwhile, when the NULL value is not set to the selection item data 143 (NO in step S8), the selection item data 143 is referred to in subsequent step S9, and a process for equipping the player object 101 with the selected item or sub weapon is executed. That is, the selection is confirmed here. In addition, in this case, a process of displaying in the above armament icon 102 an image representing the selected item or sub weapon is also executed.

Subsequently, in step S10, a process of setting the current attitude as the reference attitude is executed. This process is executed for preparation of the sub weapon or item to be readily used after the item selection process ends. For example, in the case where a slingshot is selected as a sub weapon, if the player releases his/her finger from the B button 32i, and then presses the A button without re-orienting the input device 8, the player object is allowed to launch a bullet toward a direction ahead of the player object. When the attitude of the input device after the end of the selection process is set as the reference attitude, the front end of the input device 8 in this attitude is considered to be pointed to the center of the television. As a result, even if the input device 8 is not re-oriented (even if the front end of the input device is not moved so as to be pointed to the center of the television), pressing of the A button allows a bullet to be launched to a direction ahead from the player's view point. This is the end of the item selection process according to the present embodiment.

In this manner, in the present embodiment, in accordance with the attitude of the input device 8, a predetermined object (any of the item icons 105 in the present embodiment) displayed on the screen can be selected. Accordingly, an intuitive and speedy selection operation can be realized. For example, when the item icon 105d on the lower right is to be selected while the item icon 105h on the upper left is being selected, the item icon 105d on the lower right can be selected directly (linearly) without moving the instruction icon 104 clockwise.

In addition, the positions of the item icons 105 circularly arranged are associated with the attitudes of the input device 8 required for selecting the respective item icons (for example, when the item icon 105a on the top is to be selected, the attitude of the input device 8 is changed by pointing the front end thereof upward). Thus, further intuitive selection can be achieved.

In addition, as described above, selection of any of the item icons 105 is achieved by associating the attitude of the input device 8 with each item icon 105. Thus, for example, as compared to the case where physical pressing directions of any of the cross keys are associated with the respective item icons 105, there are advantageously no limits on the number of the item icons 105 selectable. This is because in the case where the physical keys are associated with the item icons 105, the number of the keys is the upper limit of the number of the item icons 105 to be displayed on the selection screen.

In addition, since the instruction icon 104 is displayed in accordance with the attitude of the input device 8, the player can easily understand the attitude of the input device.

In addition, the attitude of the input device 8 at the time of determination of selection details (at the time of selection operation end) is set as the reference attitude, so that the reference attitude can be utilized in the subsequent process of using the selected item. Accordingly, the player can perform a speedy operation without performing additional operations after the selection, such as re-orientation of the input device 8.

Note that when any of the item icons 105 is selected, the input device 8 may be set to be vibrated. In this case, for example, control for activating the vibrator 48 may be performed when the focus flag 142 is set ON in the process in step S42 shown in FIG. 26. Accordingly, it is possible to notify the player that an item icon 105 has been selected.

In addition, in the above embodiment, the angular velocity data outputted from the gyro-sensor unit 7 is utilized for calculating the attitude of the input device 8. Other than this, for example, the acceleration data outputted from the acceleration sensor 37 may be utilized to calculate the attitude of the input device 8. In addition, other than this, for example, such data may be used that is outputted from a sensor (tilt sensor) which outputs data corresponding to the tilt of the input device 8 relative to the direction of gravity (hereinafter simply referred to as "tilt") or a sensor (magnetic sensor) which outputs data corresponding to the direction of the input device 8. In addition, the acceleration sensor and the gyro-sensor may be not only of a multi-axis detection type but also of a one-axis detection type. In addition, detection can be performed more accurately by using these sensors in a combined manner. Note that a camera (e.g., the imaging information calculation section 35) fixed to the input device 8 may be used as the sensor. In this case, an image picked up by the camera varies depending on the motion of the input device 8, and thus the analysis of the image allows determination of the motion of the input device 8. In addition, the above sensor may be arranged outside the input device 8. For example, a camera arranged outside the input device 8 functions as the sensor, and photographs the whole of the input device 8. By analyzing the image of the input device 8 captured in the photographed image, the motion of the input device 8 can be determined. Further, a collaborative system may be used which utilizes a unit fixed to the input device 8 and a unit arranged outside the input device 8. In this case, for example, a light emitting unit is arranged outside the input device 8, and a camera fixed to the television 2 or the game apparatus 3, for example, picks up light from the light emitting unit. By analyzing the image picked up by the camera, the motion of the input device 8 can be determined.

Further, in this embodiment, the process of setting the attitude of the input device 8 at the time of selection operation end as the reference attitude is performed, so that the reference attitude is to be utilized in the subsequent process of using the selected item. However, such a process is not necessarily required. That is, depending on the game content, the attitude at the time of selection operation end may be utilized as the reference attitude for the subsequent process, or need not be utilized. As long as the attitude at the time of selection operation end is made available for use as the reference attitude for the subsequent process, troubles such as re-orientation of the input device 8 can be advantageously omitted.

Further, in this embodiment, as an example, the item icons 105 are arranged in a circular ring shape on the screen. However, without limiting to this, another arrangement may be applicable. That is, as long as a predetermined attitude of the input device 8 enables selection of a predetermined object displayed on the screen, the item icons 105 may be arranged not only in a circular ring shape, but also in a triangular shape, or in a rectangular shape, for example.

Alternatively, the item icons may be arranged at the four corners of the screen, or arranged along the outer circumference of the screen.

Further, in this embodiment, as an example, the shape of the item icons 105 is a quadrangle. However, the present invention can be applicable to a case where the shape is a circle or the like.

In this embodiment, as described with reference to FIG. 19, the current attitude is projected onto a screen, and a vector thereof is calculated thereby to calculate the direction of the current attitude. Here, the vector represents a tilt direction of the input device relative to the screen, and in addition, the magnitude of the vector represents a degree of tilt of the input device. Thus, in accordance with the orientation and magnitude of the projection vector, the instruction position may be calculated. In addition, in accordance with the instruction position, selection decision of any of the item icons 105 may be performed.

Further, as to the selection of an item icon 105, for example, the instruction position on the screen is calculated based on the tilt of the input device 8, and the selection decision of the item icon 105 may be performed based on the instruction position. In this case, for example, the process as follows may be considered. Initially, a center point on a display screen is set as an origin. In addition, as the distance from the input device to the screen, a predetermined distance is set in advance as a fixed value. Next, the tilt of the input device 8 is calculated based on the angular velocity data or the like. Next, based on the predetermined distance and the calculated tilt, the instruction position on the display screen is calculated. Accordingly, based on the instruction position, the item icon 105 may be selected.

Further, in this embodiment, a case has been described where a series of processes for selecting an item icon 105 in accordance with the attitude of the input device 8 are executed on a single apparatus (game apparatus 3). However, in another embodiment, the series of processes may be executed on an information processing system including a plurality of information processing apparatuses. For example, in an information processing system which includes a terminal side device and a server side device that is communicable with the terminal side device via a network, some of the above series of processes may be executed on the server side device. Further, in an information processing system which includes a terminal side device and a server side device that is communicable with the terminal side device via a network, main processes of the series of processes may be executed on the server side device, and some of the processes may be executed on the terminal side device. Still further, in the above information processing system, the system on the server side may be configured with a plurality of information processing apparatuses, and processes to be executed on the server side may be shared by the information processing apparatus in relation to their execution.

While the invention has been described in detail, the foregoing description is in all surfaces illustrative and not restrictive. It is understood that numerous other modifications and variations can be devised without departing from the scope of the invention.

What is claimed is:

1. A non-transitory computer readable storage medium having stored therein an information processing program comprising instructions which when executed on a computer of an information processing apparatus control the computer to perform information processing based on orientation data acquired from a sensor detecting an orientation of a handheld input device, the information processing comprising:

storing correspondence between (a) a plurality of virtual selection target objects and (b) a corresponding plurality of tilt orientations of the input device, wherein the stored correspondence is based on (i) sector-shaped regions defining angular ranges, and (ii) corresponding tilt angle orientations of the input device;

displaying the plurality of virtual selection target objects on a display in positions corresponding to the sector-shaped region angular ranges so the virtual selection target objects are spatially separated from one another on the display, each of the displayed plurality of virtual selection target objects corresponding to a different sector-shaped region angular range and a different corresponding computer process;

acquiring the orientation data detected by the orientation sensor;

calculating a vector representing a tilt direction of the handheld input device, the vector having a magnitude representing a degree of tilt of the handheld input device, in accordance with the orientation data acquired by the orientation acquisition, the vector being calculated regardless of a pointing direction of the handheld device;

comparing the calculated vector with the stored correspondence based on the sector-shaped regions;

based on the comparison, selecting from among the plurality of spatially-separated virtual selection target objects in accordance with the handheld input device tilt direction and degree of tilt represented by the calculated vector; and performing a computer process corresponding to the selection target object selected by the object selecting.

2. The computer readable storage medium having stored therein the information processing program according to claim 1, further including instructions which when executed by the computer cause the computer to perform:

confirming selection of the selection target object selected by the object selecting; and setting, when the selection confirmation has confirmed the selection of the selection target object, the orientation of the input device as a reference orientation for the selection target object whose selection has been confirmed, and a process according to the selection target object whose selection has been confirmed is performed, based on the reference orientation set by the object reference orientation setting.

3. The computer readable storage medium having stored therein the information processing program according to claim 1, wherein the object selecting selects a selection target object from among the plurality of selection target objects in accordance with a tilt direction and a degree of tilt of the input orientation relative to the display.

4. The computer readable storage medium having stored therein the information processing program according to claim 3, wherein the object selecting:
  includes calculating a projection vector of the input orientation relative to a display surface of the display; and
  selects a selection target object from among the plurality of selection target objects in accordance with an orientation and magnitude of the projection vector.

5. The computer readable storage medium having stored therein the information processing program according to claim 1, wherein the object displaying displays the plurality of selection target objects at positions on the display, the positions corresponding to the orientations of the input device in the stored correspondence.

6. The computer readable storage medium having stored therein the information processing program according to claim 5, including further instructions causing the computer to perform:

setting a predetermined reference orientation for the input device, wherein the correspondence storage stores data of an orientation of the input device as an orientation relative to the reference orientation, and the object selecting selects one of the selection target objects in accordance with the input orientation relative to the reference orientation.

7. The computer readable storage medium having stored therein the information processing program according to claim 6, including further instructions causing the computer to perform:

calculating an angle between a direction of the reference orientation and a direction of the input orientation, wherein the object selecting selects, when the angle calculated by the angle calculating is equal to or more than a first angle, one of the selection target objects in accordance with the input orientation.

8. The computer readable storage medium having stored therein the information processing program according to claim 7, including further instructions causing the computer to perform:

cancelling a state where one of the selection target objects is selected when a second angle which is smaller than the first angle is obtained through calculation by the angle calculating.

9. The computer readable storage medium having stored therein the information processing program according to claim 7, storing further instructions causing the computer to perform:

determining whether or not the input orientation has changed to an orientation that is identical with or similar to the reference orientation, in a state where any of the selection target objects is selected by the object selecting; and cancelling a state where one of the selection target objects is selected when the return-to-reference-orientation determination has determined that the input orientation is identical with or similar to the reference orientation.

10. The computer readable storage medium having stored therein the information processing program according to claim 7, wherein:

the reference orientation setting sets as the reference orientation an orientation of the input device in a state where a predetermined axis thereof is oriented to the center of the display, and the information processing program includes further instructions causing the computer to perform displaying an instruction object which indicates a position, on the display, corresponding to the direction in which the predetermined axis of the input device is oriented, at a position, on the display unit, distanced from the center of the display unit toward the direction of the input orientation by a distance corresponding to the angle calculated by the angle calculating.

11. The computer readable storage medium having stored therein the information processing program according to claim 10, wherein
for each of the selection target objects, a predetermined range centered about the selection target object is set as a selection continuation range, and the selection continuation range of one of the selection target objects on the display overlaps with that of another one of the selection target objects arranged adjacent thereto, and
in a state where the one of the selection target objects is selected, when the instruction object is located within the overlapped portion of the selection continuation ranges, the object selecting maintains the selection state of the one of the selection target objects having been selected.

12. The computer readable storage medium having stored therein the information processing program according to claim 10, wherein when the angle calculated by the angle calculating is fixed, the distance corresponding to the angle calculated by the angle calculating in a state where one of the selection target objects is selected by the object selecting is longer than the distance corresponding to the angle calculated by the angle calculating in a state where one of the selection target objects is not selected by the object selecting.

13. The computer readable storage medium having stored therein the information processing program according to claim 6, including further instructions causing the computer to perform:
confirming selection of one of the selection target objects selected by the object selecting; and
updating the reference orientation using the orientation of the input device when the selection of the one of the selection target objects is confirmed by the selection confirmation, and
a process according to the one of the selection target objects whose selection has been confirmed.

14. The computer readable storage medium having stored therein the information processing program according to claim 13, including further instructions causing the computer to performs a process according to one of the selection target objects whose selection has been confirmed, based on the reference orientation updated by the reference orientation updating.

15. The computer readable storage medium having stored therein the information processing program according to claim 5, wherein the object displaying displays the plurality of selection target objects at positions on the display, at equal spacings, in a manner as to form a ring shape, the positions being based on the orientations of the input device corresponding to the selection target objects.

16. The computer readable storage medium having stored therein the information processing program according to claim 1, further including instructions causing the computer to perform highlighting, when one of the selection target objects has been selected by the object selecting, at least the one of the selection target objects having been selected.

17. The computer readable storage medium having stored therein the information processing program according to claim 1, wherein
the input device further includes a vibration unit, and
the information processing program includes further instructions causing the vibration unit to vibrate for a predetermined period of time when one of the selection target objects is selected by the object selecting.

18. The computer readable storage medium having stored therein the information processing program according to claim 1, wherein
the orientation sensor is an angular velocity sensor detecting angular velocities,
the information processing apparatus acquires angular velocity data representing the angular velocities from the input device including the angular velocity sensor,
the data acquisition acquires the angular velocity data, and
the input orientation calculating calculates the orientation of the input device in accordance with the angular velocity data acquired by the data acquisition.

19. The storage medium of claim 1 wherein the displayed target objects are spatially arranged around a virtual circle on the display; and the stored correspondence is based on (i) segments of the virtual circle around which the target objects are spatially arranged, and (ii) corresponding calculated tilt angle orientations of the input device.

20. The storage medium of claim 1 wherein the stored correspondence is based on distance between the input device and the display, and the selecting calculates an instruction position on the display based on the distance and the calculated orientation.

21. An information processing apparatus performing predetermined information processing based on orientation data acquired from an orientation sensor for detecting an orientation of a handheld input device, the information processing apparatus comprising:
a storage configured to store correspondence between a plurality of virtual selection target objects and a corresponding plurality of tilt orientations of the input device, wherein the stored correspondence is based on (i) sector-shaped regions defining angular ranges, and (ii) corresponding tilt angle orientations of the input device;
an object display processor configured to display the plurality of virtual selection target objects on a display in positions corresponding to the sector-shaped region angular ranges so the virtual selection target objects are spatially separated from one another on the display, each of the displayed plurality of virtual selection target objects corresponding to a different sector-shaped region angular range and a different corresponding computer process;
a data acquirer configured to acquire the detected orientation from the orientation sensor;
a processor configured to:
calculate a vector representing a tilt direction of the handheld input device, the vector having a magnitude representing a degree of tilt of the input device, in accordance with the detected orientation acquired by the data acquirer, the vector being calculated regardless of a pointing direction of the handheld device;
compare the calculated vector with the stored correspondence based on the sector-shaped regions;
based on the comparison, select a virtual selection target object from among the plurality of virtual selection target objects in accordance with the input device tilt direction and degree of tilt represented by the calculated vector; and
perform a process corresponding to the selection target object selected by the object selecting.

22. The apparatus of claim 21 wherein the orientation sensor comprises at least one of an accelerometer and an angular rate sensor.

23. An information processing control method for performing predetermined information processing based on orientation data acquired from an orientation sensor for detecting an orientation of a handheld input device, the method for further performing a process according to a selection target object selected from among a plurality of selection target objects, the method comprising:

storing correspondence data representing correspondence between (a) the plurality of virtual selection target objects and (b) a corresponding plurality of tilt orientations of the input device, wherein the stored correspondence is based on (i) sector-shaped regions defining angular ranges, and (ii) corresponding tilt angle orientations of the input device;

displaying the plurality of virtual selection target objects on a display in positions corresponding to the sector-shaped region angular ranges so the virtual selection target objects are spatially separated from one another on the display, each of the displayed plurality of virtual selection target objects corresponding to a different sector-shaped region angular range and a different corresponding computer process;

acquiring the orientation data;

calculating a vector representing a tilt direction of the handheld input device, the vector having a magnitude representing a degree of tilt of the handheld input device, which is an orientation of the input device, in accordance with the orientation data acquired by the data acquisition, the vector being calculated regardless of a pointing direction of the handheld device;

comparing the calculated vector with the stored correspondence based on the sector-shaped regions;

based on the comparison, selecting a selection target object from among the plurality of virtual selection target objects in accordance with the handheld input device tilt direction and degree of tilt represented by the calculated vector; and performing a process corresponding to the selection target object selected by the object selecting.

24. An information processing system performing predetermined information processing based on orientation data acquired from an orientation sensor for detecting an orientation of a handheld input device, the information processing system comprising:

correspondence data storage storing correspondence data representing correspondence between (a) a plurality of selection target objects and (b) a corresponding plurality of tilt orientations of the input device, wherein the stored correspondence is based on (i) sector-shaped regions defining angular ranges, and (ii) corresponding tilt angle orientations of the input device;

an object display generator configured to display the plurality of selection target objects on a display in positions corresponding to the sector-shaped region angular ranges so the virtual selection target objects are spatially separated from one another on the display, each of the displayed plurality of virtual selection target objects corresponding to a different sector-shaped region angular range and a different corresponding computer process;

a data acquirer configured to acquire the orientation data;

an input orientation calculator configured to calculate a vector representing a tilt direction of the handheld input device, the vector having a magnitude representing a degree of tilt of the handheld input device, in accordance with the orientation data acquired by the data acquirer;

a comparator comparing the calculated vector with the stored correspondence based on the sector-shaped regions;

an object selector configured to select a selection target object from among the plurality of selection target objects in accordance with the handheld input device tilt direction and degree of tilt represented by the calculated vector; and an information processor configured to perform a process corresponding to the selection target object selected by the object selector.

* * * * *